US011041959B2

(12) United States Patent
Lucky et al.

(10) Patent No.: US 11,041,959 B2
(45) Date of Patent: Jun. 22, 2021

(54) EPHEMERIS INFORMATION MANAGEMENT FOR SATELLITE COMMUNICATION

(71) Applicant: QUALCOMM Incorporated, San Diego, CA (US)

(72) Inventors: Kundan Kumar Lucky, Bangalore (IN); Gene Wesley Marsh, Encinitas, CA (US); Srikant Jayaraman, San Diego, CA (US); William Ames, Poway, CA (US); Dan Vassilovski, Del Mar, CA (US); Fatih Ulupinar, San Diego, CA (US); Rohit Kapoor, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 16/069,829

(22) PCT Filed: Jun. 30, 2016

(86) PCT No.: PCT/US2016/040450
§ 371 (c)(1),
(2) Date: Jul. 12, 2018

(87) PCT Pub. No.: WO2017/142584
PCT Pub. Date: Aug. 24, 2017

(65) Prior Publication Data
US 2019/0041526 A1    Feb. 7, 2019

(30) Foreign Application Priority Data
Feb. 15, 2016   (IN) .............................. 201641005148

(51) Int. Cl.
*G01S 19/05*         (2010.01)
*G01S 19/27*         (2010.01)
(Continued)

(52) U.S. Cl.
CPC .............. *G01S 19/05* (2013.01); *G01S 19/08* (2013.01); *G01S 19/27* (2013.01); *G01S 19/28* (2013.01)

(58) Field of Classification Search
CPC .......... G01S 19/05; G01S 19/08; G01S 19/27; G01S 19/28
(Continued)

(56) References Cited

U.S. PATENT DOCUMENTS 5,999,125 A * 12/1999 Kurby ..................... G01S 19/06
                                                  342/357.52
6,313,787 B1   11/2001 King et al.
(Continued)

FOREIGN PATENT DOCUMENTS

CN          1155192 A      7/1997
CN          1296367 A      5/2001
(Continued)

OTHER PUBLICATIONS

International Search Report and Written Opinion—PCT/US2016/040450—ISA/EPO—dated Oct. 27, 2016.

*Primary Examiner* — Chuong P Nguyen

(57) ABSTRACT

Various aspects of the disclosure relate to managing ephemeris information. Provisions are made for providing ephemeris information to a user terminal (UT). Messages are defined for sending ephemeris information and for requesting ephemeris information. Ephemeris information for a subset of the satellites in a constellation may be sent to a UT to reduce signaling load. A UT may manage a database of ephemeris information to ensure freshness of the ephemeris information.

10 Claims, 24 Drawing Sheets

(51) Int. Cl.
*G01S 19/08* (2010.01)
*G01S 19/28* (2010.01)

(58) Field of Classification Search
USPC ............ 342/357.42, 357.45, 357.66, 357.67
See application file for complete search history.

(56) References Cited

U.S. PATENT DOCUMENTS

| | | | |
|---|---|---|---|
| 6,559,795 B1 | 5/2003 | McBurney et al. | |
| 6,861,980 B1 | 3/2005 | Rowitch et al. | |
| 6,915,210 B2* | 7/2005 | Longhurst | G01S 19/072 |
| | | | 701/469 |
| 7,142,157 B2 | 11/2006 | Garin et al. | |
| 7,427,951 B2* | 9/2008 | Kuo | G01S 19/258 |
| | | | 342/357.64 |
| 7,747,257 B2* | 6/2010 | Zhao | G01S 19/071 |
| | | | 455/456.1 |
| 8,446,315 B2* | 5/2013 | Tomita | G01S 19/05 |
| | | | 342/357.66 |
| 8,497,801 B2* | 7/2013 | Garin | G01S 19/258 |
| | | | 342/357.66 |
| 8,538,327 B2* | 9/2013 | Sayeed | H04B 7/18589 |
| | | | 455/13.2 |
| 8,630,796 B2* | 1/2014 | Sullivan | G01S 19/256 |
| | | | 701/408 |
| 8,654,009 B2* | 2/2014 | Garin | G01S 19/258 |
| | | | 342/357.66 |
| 9,158,002 B2* | 10/2015 | Pratt | G01S 19/28 |
| 9,274,225 B2 | 3/2016 | Abraham et al. | |
| 10,841,001 B2* | 11/2020 | Lucky | H04B 7/18582 |
| 2009/0216447 A1* | 8/2009 | Uchida | G01S 19/05 |
| | | | 701/469 |
| 2012/0166081 A1* | 6/2012 | Uchida | G01S 19/27 |
| | | | 701/468 |
| 2013/0314276 A1 | 11/2013 | Zhang et al. | |
| 2015/0153458 A1 | 6/2015 | Syrjarinne et al. | |
| 2015/0362597 A1* | 12/2015 | Syrjarinne | G01S 19/20 |
| | | | 342/357.58 |
| 2018/0074208 A1* | 3/2018 | Ravishankar | G01S 19/258 |

FOREIGN PATENT DOCUMENTS

| | | |
|---|---|---|
| CN | 101558323 A | 10/2009 |
| EP | 0748062 A2 | 12/1996 |
| EP | 0774843 A2 | 5/1997 |
| EP | 0971488 A2 | 1/2000 |
| EP | 2354803 A1 | 8/2011 |
| JP | H09172401 A | 6/1997 |
| WO | WO-9719524 A1 | 5/1997 |
| WO | WO-2006031652 | 3/2006 |
| WO | 2008053308 A2 | 5/2008 |

\* cited by examiner

NORMAL OPERATION – 3 MINUTES, STATIONARY UTs

NORMAL OPERATION – 6 MINUTES, MOVING UTs

OPERATION NEAR SEAMS– 6 MINUTES, MOVING UTs

EPHEMERIS INFORMATION MANAGEMENT FOR SATELLITE COMMUNICATION

CROSS-REFERENCE TO RELATED APPLICATION(S)

This application claims priority to and the benefit of India patent application number 201641005148 filed on Feb. 15, 2016, the entire content of which is incorporated herein by reference.

INTRODUCTION

Various aspects described herein relate to satellite communication and, more particularly but not exclusively, to managing ephemeris information for satellite communication.

Conventional satellite-based communication systems include gateways and one or more satellites to relay communication signals between the gateways and one or more user terminals (UTs). A gateway is an earth station having an antenna for transmitting signals to, and receiving signals from, communication satellites. A gateway provides communication links, using satellites, for connecting a UT to other UTs or users of other communication systems, such as a public switched telephone network, the Internet and various public and/or private networks. A satellite is an orbiting receiver and repeater used to relay information.

A satellite can receive signals from and transmit signals to a UT provided the UT is within the "footprint" of the satellite. The footprint of a satellite is the geographic region on the surface of the earth within the range of signals of the satellite. The footprint is usually geographically divided into "beams," through the use of antennas (e.g., the antennas may be used to create fixed, static beams or may be used to create dynamically adjustable beams through beam-forming techniques). Each beam covers a particular geographic region within the footprint. Beams may be directed so that more than one beam from the same satellite covers the same specific geographic region. In addition, beams from multiple satellites may be directed to cover the same geographic region.

Geosynchronous satellites have long been used for communication. A geosynchronous satellite is stationary relative to a given location on the earth. However, because geosynchronous satellites are limited to a geosynchronous orbit (GSO), which is a circle having a radius of approximately 42,164 km from the center of the earth directly above the earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire earth or at least large parts of the earth. In non-geosynchronous satellite-based systems, such as LEO satellite-based systems, the satellites move relative to a communication device (such as a gateway or a UT) on the ground.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: communicate a request via a satellite for satellite ephemeris information; and communicate a response to the request, wherein the response comprises satellite ephemeris information.

Another aspect of the disclosure provides a method for communication including: communicating a request via a satellite for satellite ephemeris information; and communicating a response to the request, wherein the response comprises satellite ephemeris information.

Another aspect of the disclosure provides an apparatus configured for communication. The apparatus including: first means for communicating a request via a satellite for satellite ephemeris information; and second means for communicating a response to the request, wherein the response comprises satellite ephemeris information.

Another aspect of the disclosure provides a non-transitory computer-readable medium storing computer-executable code, including code to: communicate a request via a satellite for satellite ephemeris information; and communicate a response to the request, wherein the response comprises satellite ephemeris information.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

The disclosure relates in some aspects to sending ephemeris information to a user terminal (UT) via a satellite and managing the ephemeris information at the UT. A satellite network broadcasts ephemeris information to enable a UT to obtain current ephemeris information for nearby satellites. The satellite network may send ephemeris information for a subset of the satellites in a constellation to reduce signaling load. A UT can also send a request for ephemeris information to the satellite network via satellite signaling. In this case, the network may send a message (e.g., a unicast message) including the requested ephemeris information to the UT via satellite signaling. In addition, the UT may manage its own database of ephemeris information to ensure that the UT has access to current ephemeris information.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Figure 1:
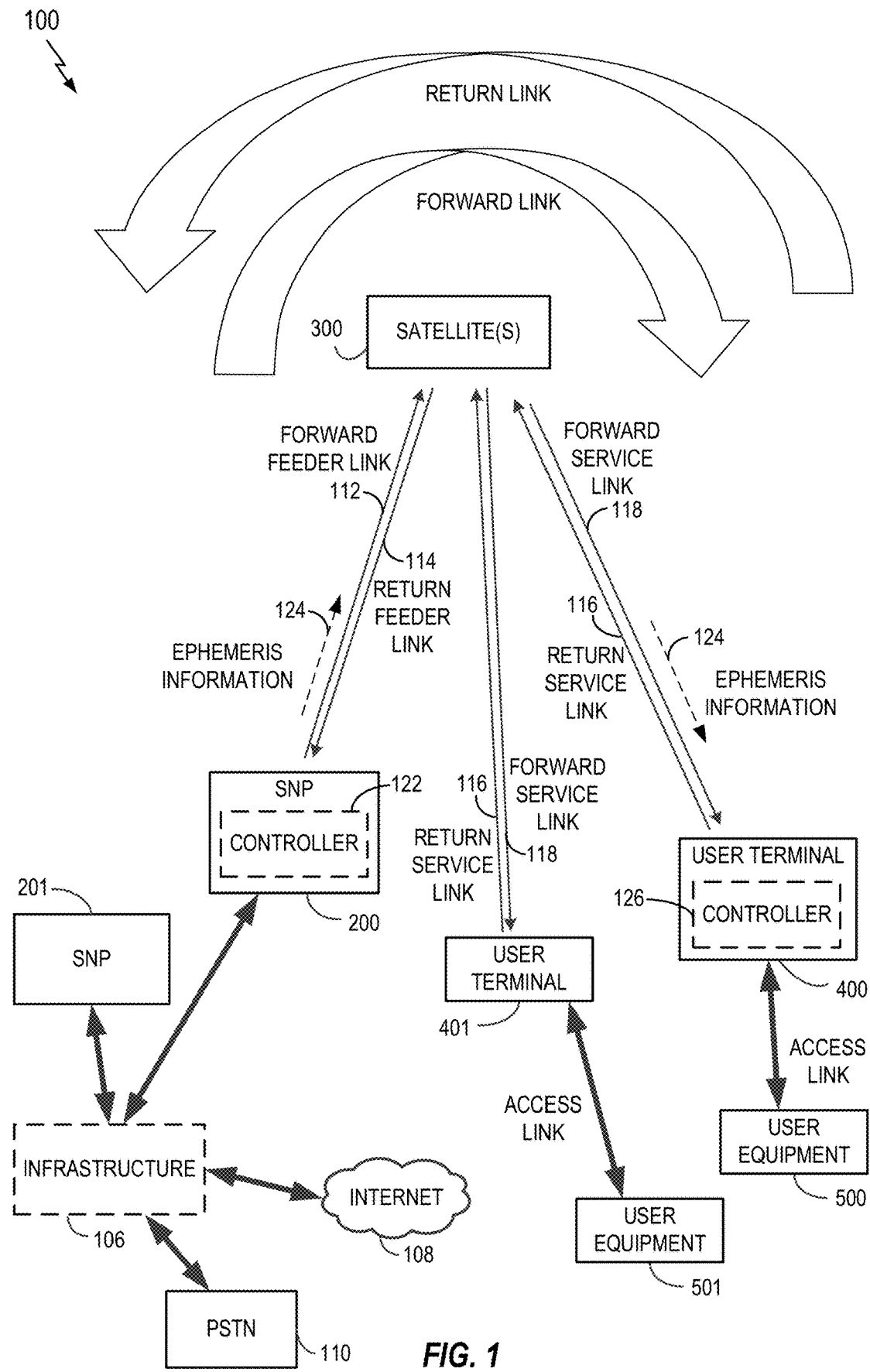
FIG. 1 is a block diagram of an example communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO), a satellite network portal (SNP) 200 (e.g., corresponding to a satellite gateway) in communication with the satellite 300, a plurality of UTs 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The SNP 200 may have access to the Internet 108 or one or more other types of public, semiprivate or private networks. In the example illustrated in FIG. 1, the SNP 200 is in communication with infrastructure 106, which is capable of accessing the Internet 108 or one or more other types of public, semiprivate or private networks. The SNP 200 may also be coupled to various types of communication backhaul, including, for example, landline networks such as optical fiber networks or public switched telephone networks (PSTN) 110. Further, in alternative implementations the SNP 200 may interface to the Internet 108, PSTN 110, or one or more other types of public, semiprivate or private networks without using the infrastructure 106. Still further, the SNP 200 may communicate with other SNPs, such as the SNP 201 through the infrastructure 106 or alternatively may be configured to communicate to the SNP 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the SNP 200 in both directions are called feeder links, whereas communication between the satellite and each of the UTs 400 and 401 in both directions are called service links. A signal path from the satellite 300 to a ground station, which may be the SNP 200 or one of the UTs 400 and 401, may be generically called a downlink. A signal path from a ground station to the satellite 300 may be generically called an uplink. Additionally, as illustrated, signals can have a general directionality such as a forward link and a return link (or reverse link). Accordingly, a communication link in a direction originating from the SNP 200 and terminating at the UT 400 through the satellite 300 is called a forward link, whereas a communication link in a direction originating from the UT 400 and terminating at the SNP 200 through the satellite 300 is called a return link or a reverse link. As such, the signal path from the SNP 200 to the satellite 300 is labeled a "Forward Feeder Link" 112 whereas the signal path from the satellite 300 to the SNP 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

In accordance with the teachings herein, the satellite communication system 100 manages ephemeris information. In some implementations, the SNP 200 includes a controller 122 that communicates ephemeris information and/or determines ephemeris information. In some implementations, the controller 122 receives ephemeris information and forwards the ephemeris information to the UTs. In some implementations, the controller 122 generates ephemeris information and forwards the ephemeris information 124 to the UTs. In some implementations, the UT 400 includes a controller 126 that receives and manages a local copy of ephemeris information. Other components of the satellite communication system 100 may include corresponding controllers as well. For example, other SNPs, satellites, and UTs (not shown) may include a corresponding controller.

Figure 2:
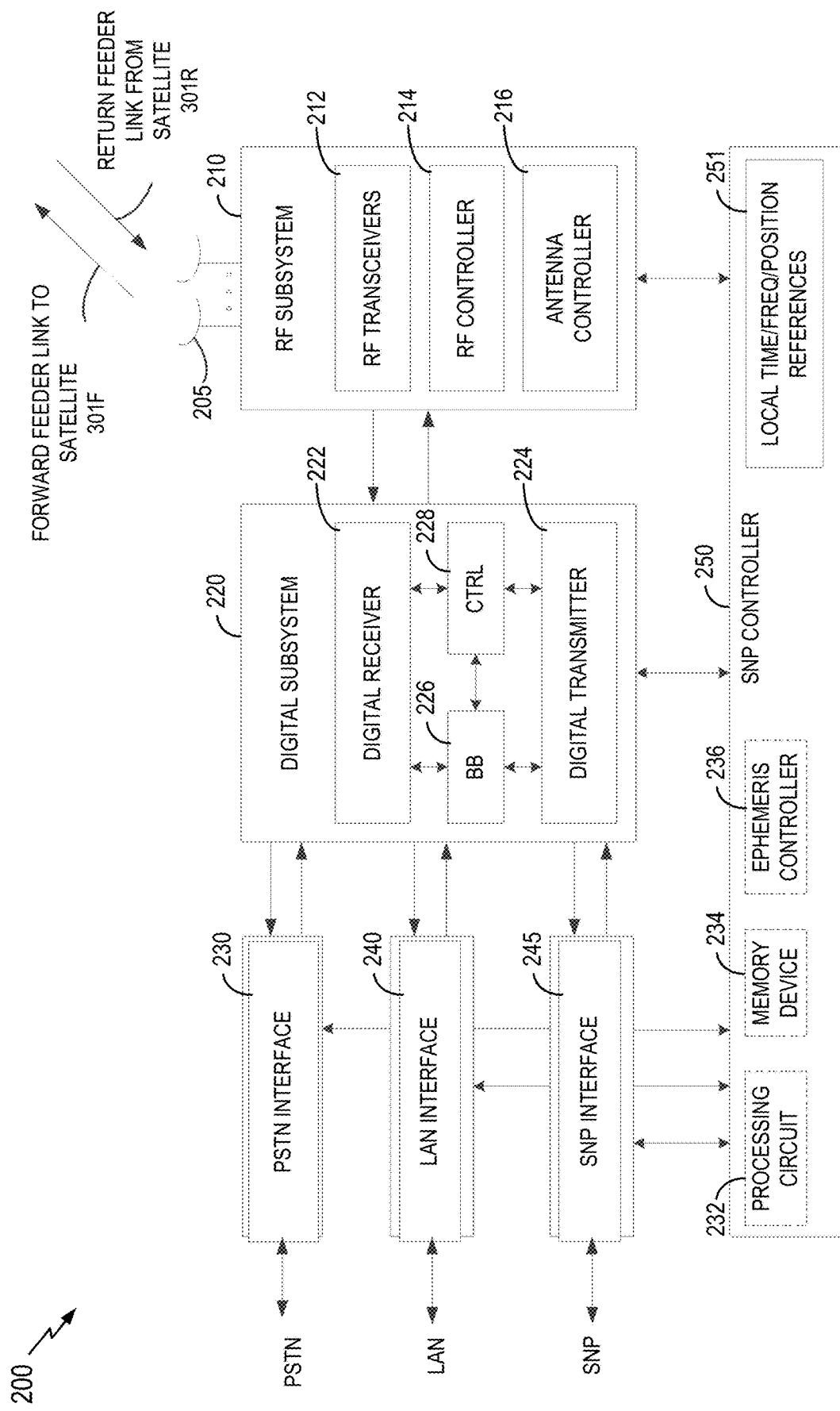
FIG. 2 is a block diagram of one example of a satellite network portal (SNP) of FIG. 1 in accordance with some aspects of the disclosure.

FIG. 2 is an example block diagram of the SNP 200, which also can apply to the SNP 201 of FIG. 1. The SNP 200 is shown to include a number of antennas 205, an RF subsystem 210, a digital subsystem 220, a Public Switched Telephone Network (PSTN) interface 230, a Local Area Network (LAN) interface 240, an SNP interface 245, and an SNP controller 250. The RF subsystem 210 is coupled to the antennas 205 and to the digital subsystem 220. The digital subsystem 220 is coupled to the PSTN interface 230, to the LAN interface 240, and to the SNP interface 245. The SNP controller 250 is coupled to the RF subsystem 210, the digital subsystem 220, the PSTN interface 230, the LAN interface 240, and the SNP interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the SNP 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the SNP 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The SNP interface 245 may provide communication signals to, and receive communication signals from, one or more other SNPs associated with the satellite communication system 100 of FIG. 1 (and/or to/from SNPs associated with other satellite communication systems, not shown for simplicity). For some implementations, the SNP interface 245 may communicate with other SNPs via one or more dedicated communication lines or channels (not shown for simplicity). For other implementations, the SNP interface 245 may communicate with other SNPs using the PSTN 110 and/or other networks such as the Internet 108 (see also FIG. 1). For at least one implementation, the SNP interface 245 may communicate with other SNPs via the infrastructure 106.

Overall SNP control may be provided by the SNP controller 250. The SNP controller 250 may plan and control utilization of the satellite 300's resources by the SNP 200. For example, the SNP controller 250 may analyze trends, generate traffic plans, allocate satellite resources, monitor (or track) satellite positions, and monitor the performance of the SNP 200 and/or the satellite 300. The SNP controller 250 may also be coupled to a ground-based satellite controller (not shown for simplicity) that maintains and monitors orbits of the satellite 300, relays satellite usage information to the SNP 200, tracks the positions of the satellite 300, and/or adjusts various channel settings of the satellite 300.

For the example implementation illustrated in FIG. 2, the SNP controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the SNP 200 with each other and/or with the satellite(s) 300. The local time, frequency, and position references 251 may also provide position information (e.g., ephemeris data) of the satellite(s) 300 to the various components of the SNP 200. Further, although depicted in FIG. 2 as included within the SNP controller 250, for other implementations, the local time, frequency, and position references 251 may be a separate subsystem that is coupled to the SNP controller 250 (and/or to one or more of the digital subsystem 220 and the RF subsystem 210).

Although not shown in FIG. 2 for simplicity, the SNP controller 250 may also be coupled to a network control center (NCC) and/or a satellite control center (SCC). For example, the SNP controller 250 may allow the SCC to communicate directly with the satellite(s) 300, for example, to retrieve ephemeris data from the satellite(s) 300. The SNP controller 250 may also receive processed information (e.g., from the SCC and/or the NCC) that allows the SNP controller 250 to properly aim its antennas 205 (e.g., at the appropriate satellite(s) 300), to schedule beam transmissions, to coordinate handoffs, and to perform various other well-known functions.

The SNP controller 250 may include one or more of a processing circuit 232, a memory device 234, or an ephemeris controller 236 that independently or cooperatively perform ephemeris information-related operations for the SNP 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the ephemeris controller 236 is configured (e.g., programmed) to perform some or all of these operations. Although depicted in FIG. 2 as included within the SNP controller 250, for other implementations, one or more of the processing circuit 232, the memory device 234, or the ephemeris controller 236 may be a separate subsystem that is coupled to the SNP controller 250 (and/or to one or more of the digital subsystem 220 and the RF subsystem 210).

Figure 3:
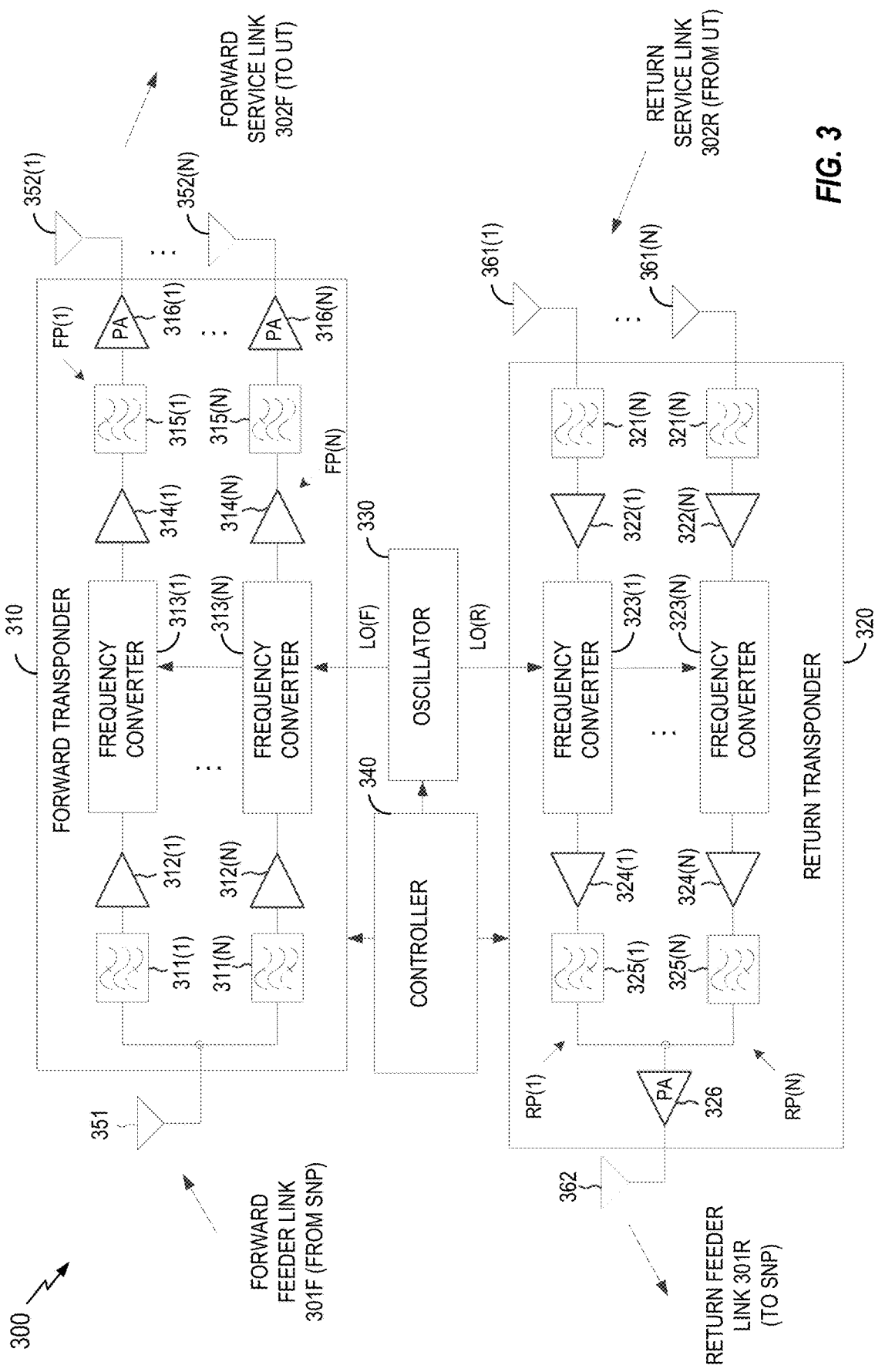
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the SNP 200 and the UT 400. It will be appreciated that the disclosure is not limited to any specific satellite configuration and any satellite or combinations of satellites that can provide the functional connection between the SNP 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352. The return transponder 320, which includes a number N of return paths RP(1)-RP(N), receives communication signals from the UT 400 along the return service link 302R via the antennas 361(1)-361(N), and transmits communication signals to the SNP 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the SNP 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the SNP 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the SNP 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the SNP 200.

The controller 340, which is coupled to the forward transponder 310, the return transponder 320, and the oscillator 330, may control various operations of the satellite 300 including (but not limited to) channel allocations. In one aspect, the controller 340 may include a processing circuit 364 (e.g., a processor) coupled to a memory (e.g., a memory device 366). The memory may include a non-transitory computer-readable medium (e.g., one or more nonvolatile memory elements, such as an EPROM, an EEPROM, a Flash memory, a hard drive, etc.) storing instructions that, when executed by the processing circuit 364, cause the satellite 300 to perform operations including (but not limited to) those described herein.

Figure 4:
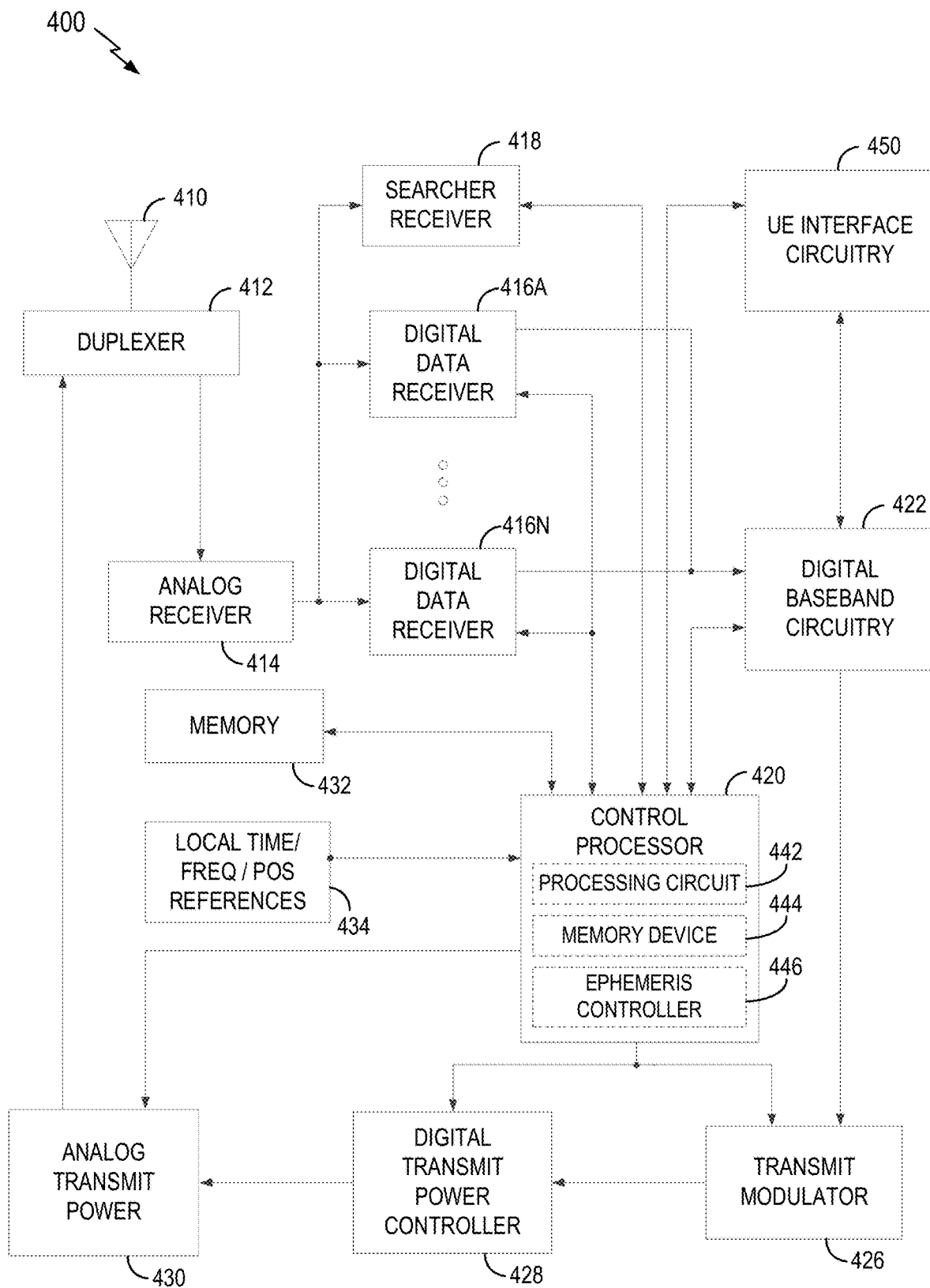
FIG. 4 is a block diagram of one example of a UT of FIG. 1 in accordance with some aspects of the disclosure.

An example of a transceiver for use in the UT 400 or the UT 401 is illustrated in FIG. 4. In FIG. 4, at least one antenna 410 is provided for receiving forward link communication signals (e.g., from the satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or an ephemeris controller 446 that independently or cooperatively perform ephemeris information-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the ephemeris controller 446 is configured (e.g., programmed) to perform some or all of these operations. Although depicted in FIG. 4 as included within the control processor 420, for other implementations, one or more of the processing circuit 442, the memory device 444, or the ephemeris controller 446 may be a separate subsystem that is coupled to the control processor 420.

Figure 5:
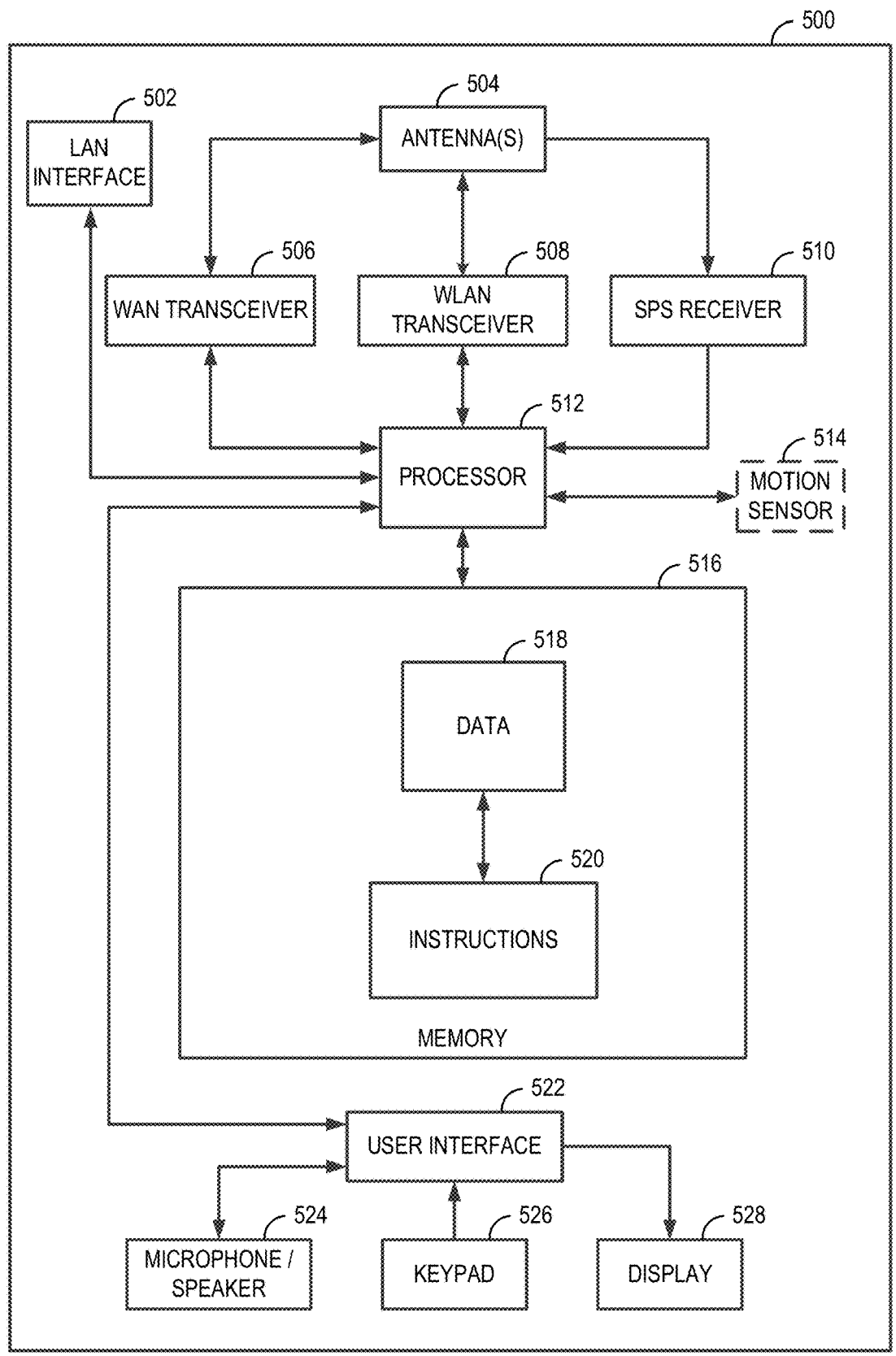
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage. A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the SNP's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in an SNP. Thus, an SNP may have several NACs (e.g., implemented by the SNP controller 250 of FIG. 2), each of which controls a corresponding one of the satellites controlled by the SNP. In addition, a given satellite may support multiple beams. Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

Ephemeris Information

In an example non-geosynchronous satellite communication system implementation, satellites move over the earth in ascending or descending paths (e.g., approximately a north-south or south-north direction). The rotation of the earth causes an apparent motion in east-west direction. Each UT obtains the expected path of the satellites (satellite ephemeris information) that the UT is going to see for some prescribed period of time in the future so that it can establish radio connections to the satellites. In some aspects, the UT can receive this satellite ephemeris information via a broadcast message and/or a unicast message from the network (e.g., from an SNP). In some aspects, the UT can request this satellite ephemeris information if it is not available and has not been provided to it by the network in reasonable time. The disclosed implementation works at all longitude and latitude values, including satellite constellation designs where satellites in adjacent planes are moving in opposite directions. The disclosed implementation also provides for unambiguous storage of the satellite ephemeris information and discard of this information if it becomes stale.

Figure 6:
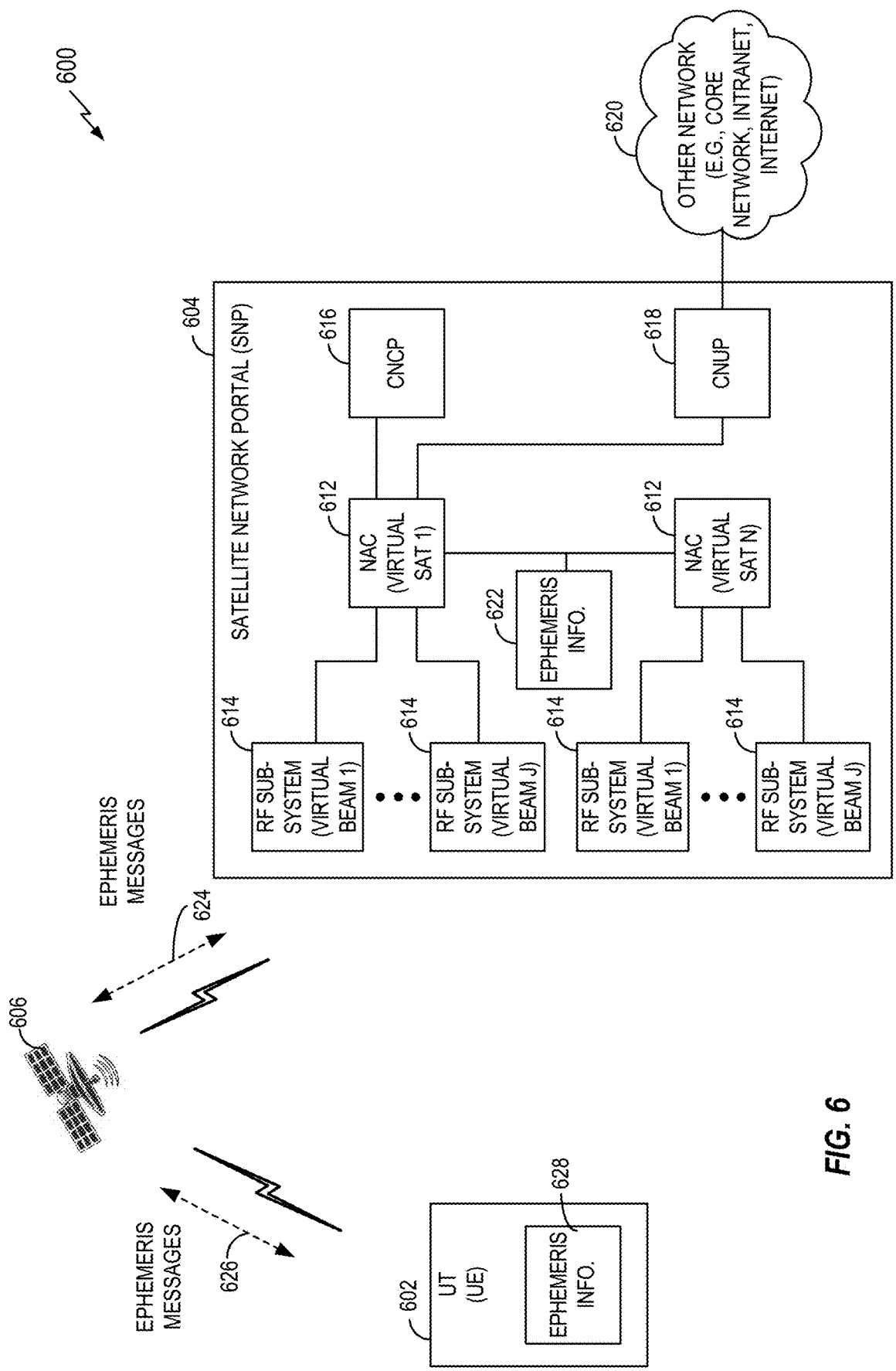
FIG. 6 is a block diagram of an example communication system in accordance with some aspects of the disclosure.

FIG. 6 illustrates a UT 602 in communication with an SNP 604 via a satellite 606 in a non-geosynchronous satellite communication system 600, such as a LEO satellite communication system for data, voice, video, or other communication. The UT 602, the SNP 604, and the satellite 606 may respectively correspond to, for example, the UT 400, the SNP 200, and the satellite 300 of FIG. 1.

The SNP 604 includes network access controllers (NACs) 612, each of which interfaces with one or more radio frequency (RF) subsystems 614 for communicating with the UT 602 and other UTs (not shown) via the satellite 606 (or some other satellite, not shown). The SNP 604 also includes a core network control plane (CNCP) 616 and a core network user plane (CNUP) 618, or other similar functionality, for communicating with another network 620. The network 620 may represent, for example, one or more of a core network (e.g., 3G, 4G, 5G, etc.), an intranet, or the Internet.

The SNP 604 may determine (e.g., receive or generate) ephemeris information 622. The SNP may then broadcast or unicast the ephemeris information 622 to the UT 602 via messages 624 and 626 relayed by the satellite 606. The UT 602 thereby maintains its own ephemeris information 628.

Ephemeris Messages

Figure 7:
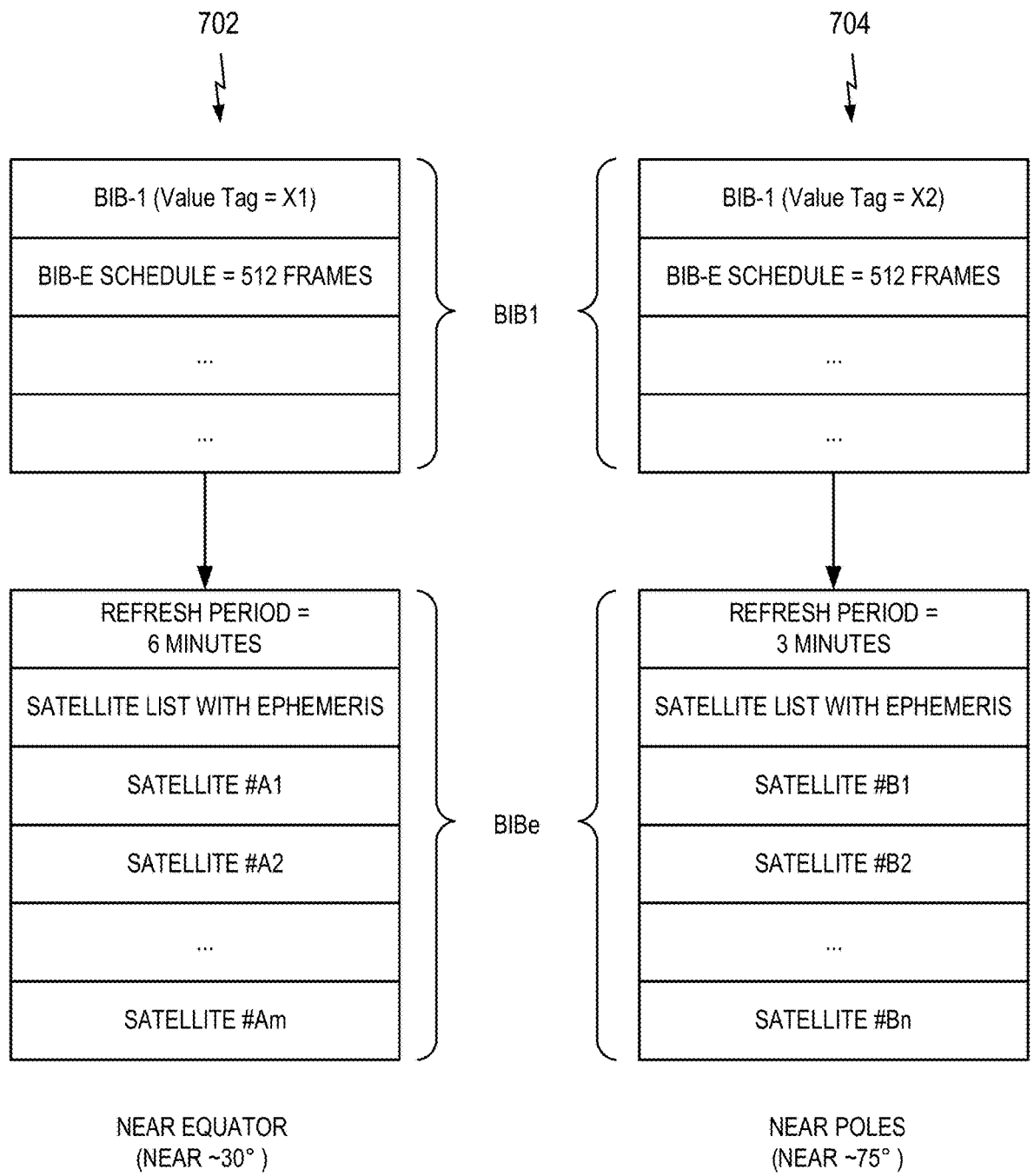
FIG. 7 is a diagram of example broadcast information blocks in accordance with some aspects of the disclosure.

An SNP may broadcast to all of its UTs a Broadcast Information Block (BIB) message that includes ephemeris information. For examples, BIB messages may be broadcast on an overhead (or common channel). Example BIB structures 702 and 704 are shown in FIG. 7. In these examples, the BIB structure 702 corresponds to a location near the equator, while the BIB structure 702 corresponds to a location near the poles. Each BIB structure includes a first BIB element, referred to as BIB1, that includes information regarding a schedule (e.g., periodicity) of another BIB element, referred to as BIBe, that includes the ephemeris information for a set of satellites.

In an example implementation, the value tag included in the BIB1 does not change for any updates to the BIBe. One proposed periodicity of the BIBe is 512 frames (e.g., 5.12 seconds). In this case, the BIB1 indicates that the BIBe will be sent every 512 frames. Other values may be used.

The "refresh period" indicates the time duration within which the UT must perform another reading of the BIBe. If the value of the "refresh period" is set to 6 minutes, the UT will attempt to read the BIBe once every 6 minutes. If the value of the "refresh period" is set to 0, the UT will keep attempting to read the BIBe (e.g., every time the BIBe is broadcast by the SNP).

Within a given "refresh period," a UT will "see" (e.g., receive signals from) a subset of the broadcast satellites—the UT will not "see" any other satellites within the "refresh period." The BIBe includes, at least, all the satellites that any UT under its footprint may "see" within the next "refresh period" duration.

Therefore, the number of satellites included in the BIBe may be a function of the "refresh period." For example, if a larger number of satellites are listed in the BIBe, a longer "refresh period" may be specified.

The number of satellites included in the BIBe may be a function of the local latitude. For example, satellite paths may converge at northern latitudes and southern latitudes. Therefore, to cover a UT for a given period of time (e.g., 6 minutes) at these latitudes, more satellites may be listed in the BIBe for these latitudes than in a BIBe for a central latitude (e.g., a latitude closer to the equator).

Relatively small ephemeris information messages may be sent (e.g., due to the use of fewer satellite entries, fewer ephemeris elements, smaller ephemeris elements, or less strict accuracy requirements). In some implementations, an ephemeris information message may be at most three bytes per term (e.g., ephemeris information element). In some implementations, an ephemeris information message may be at most two bytes per term (e.g., ephemeris information element).

Examples of ephemeris messages include a Radio Ephemeris Information Request message and a Radio Ephemeris Information message. Each of these messages will be discussed in turn.

A Radio Ephemeris Information Request message is used by the UT for requesting the ephemeris information in a unicast manner A UT may send such a request, for example, if the UT determines that it will not be able to receive the ephemeris information via broadcasts messages before expiration of the "refresh period."

The request could be for the ephemeris information for the full constellation (e.g., 600-1000 satellites) or the request could be for only a part of the constellation (e.g., consisting of those satellites that will be seen in the next few minutes). A "request type" bit in the message may indicate the type of request. A request for the ephemeris information for the full constellation will cause the SNP to provide all of this information.

A Radio Ephemeris Information message is the response message containing the ephemeris information. In some implementations, the format of the information in this unicast message is the same as that included in an ephemeris information broadcast message (e.g., that includes the BIBe). In some implementations, the format of the information in this unicast message is different from that included in an ephemeris information broadcast message. The response may contain the ephemeris information for the full constellation or only a part of it, as requested by the UT. As with BIBs, the number of satellites included in this message may be a function of the included "refresh period" as well as the local latitude.

Ephemeris Elements

In an example implementation, the ephemeris information for one satellite consists of the eight elements that follow. Other sets of information and/or other field lengths may be used in other implementations.

Satellite Identifier Number (Id) uniquely identifies a satellite within the system. The length of this field may be 16 bits. This field may be over-provisioned to allow for any unanticipated growth in the number of satellites.

Epoch Time ($T_0$) indicates the predictive fit-time for the satellite. It is the GPS time in seconds with $t_0$ set to 00:00:00 on 1 Jan. 1980. The length of this field may be 32 bits and its rollover may happen in 2116.

Semi-Major Axis (a) indicates the length of the semi-major axis of the elliptical path of the satellite in meters. The length of this field may be 24 bits.

Eccentricity (e) indicates the eccentricity of the elliptical path of the satellite. The length of this field may be 24 bits. This element may have a precision of 1.00E-07.

Argument of Perigee (w) indicates the argument of the perigee of the path of the satellite. The length of this field may be 24 bits. This element may have a precision of 0.0000214576 degrees.

Inclination (i) indicates the inclination of the path of the satellite. The length of this field may be 24 bits. This element may have a precision of 0.0000053644 degrees.

Right Ascension of Ascending Node (Ω or Omega) indicates the right ascension of the ascending node. The length of this field may be 24 bits. This element may have a precision of 0.0000214576 degrees.

Mean Anomaly at Epoch ($M_0$) indicates the mean anomaly at the epoch time. The length of this field may be 24 bits. This element may have a precision of 0.0000214576 degrees. Table 1 summarizes one example of the above ephemeris elements.

TABLE 1

| Field | Description | Type | Units | Bits | Precision | Range |
|---|---|---|---|---|---|---|
| Id | Satellite Identifier Number | unsigned | dimensionless | 16 | 1 | 65536 Satellites |
| $T_0$ | Epoch Time | unsigned | seconds | 32 | 1 | Rollover in 2116 |
| a | Semi-Major axis | unsigned | meters | 24 | 1 | 0 to 16,777 km |
| e | Eccentricity | unsigned | dimensionless | 24 | 1.00E-07 | 0 to 1.6777 |
| w | Argument of Perigee | signed | degrees | 24 | 0.000021 | +/-180 deg |
| i | Inclination | unsigned | degrees | 24 | 0.000005 | 0 to 90 deg |
| Ω | Right Ascension of Ascending Node | unsigned | degrees | 24 | 0.000021 | 0 to 360 deg |
| $M_0$ | Mean Anomaly at Epoch | unsigned | degrees | 24 | 0.000021 | 0 to 360 deg |
| | | | Total | 192 | = 24 | bytes |

A UT may calculate other ephemeris elements based on received ephemeris information. For example, a UT may calculate rate terms that are associated with received inclination, angle information (e.g., precession rate of right ascension node to the west), or other time dependent secular and periodic changes to ephemeris elements.

Satellite List

In an example implementation, the footprint of a satellite completely crosses over a point on earth in the north-south direction in about 3 minutes at all latitudes. In addition, the satellite planes appear to move by a maximum of ~85 km (at equator) in those 3 minutes due to the rotational motion of earth. FIGS. 8-11 illustrate several examples of satellite footprints in different scenarios. To simply the complexity of the figures, the footprint of a satellite at a given point in time is simply represented by a square (e.g., numbered as 1, 2, 3, etc., in the figures).

Figure 8:
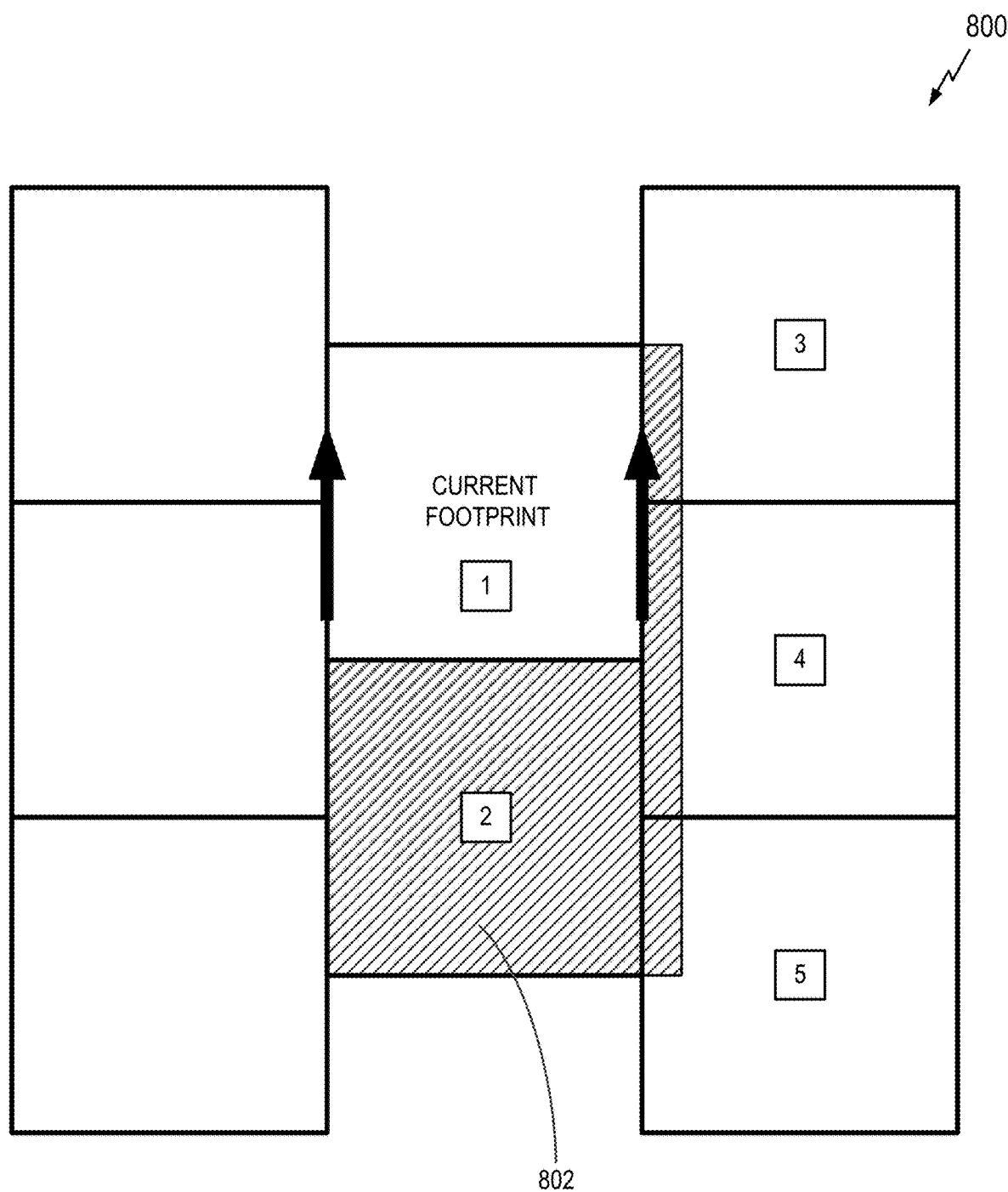
FIG. 8 is a diagram of example satellite footprints in accordance with some aspects of the disclosure.

FIG. 8 illustrates a set of footprints 800 where all the static (stationary) UTs located within the footprint of the current satellite will be effectively located somewhere within the shaded region 802 in the next 3 minutes. Thus, the ephemeris information provided to the UTs should be valid over this period of time (corresponding to the region 802, including the current footprint). Other time frames may be applicable in other implementations.

The current footprint in FIG. 8 represents the area where a given overhead message (e.g., a message including the BIBe) will be received by UTs. The portion of the shaded region 802 to the right of the first and second footprints (i.e., in the left hand side of the footprints 3, 4, and 5) is due to the rotation of the earth (from west to east) below the satellites. Thus, the constellation slides from east to west.

Satellites in adjacent planes may be offset in phase (the phase offset of ascending nodes in those adjacent planes). In the examples illustrated in FIGS. 8, 9, 10, and 11, an offset of 5° has been assumed. Although the actual phase offset may differ operationally from the 5° shown, the number of satellites visible within the temporal window examined in these examples need not change with the choice of the offset.

A moving UT (e.g., a UT on-board an aircraft) may also change its position in those 3 minutes. Therefore, the satellites that a UT may "see" within the next 3 minutes include the following: 1) the current satellite; 2) the next two satellites in the same plane; and, 3) the neighbouring satellites (in the two adjacent planes) of the above three satellites.

Since there is an offset between the satellite positions in the neighbouring planes, there are two neighbours of a satellite on either side. This makes the total number of satellites equal to 9.

Figure 9:
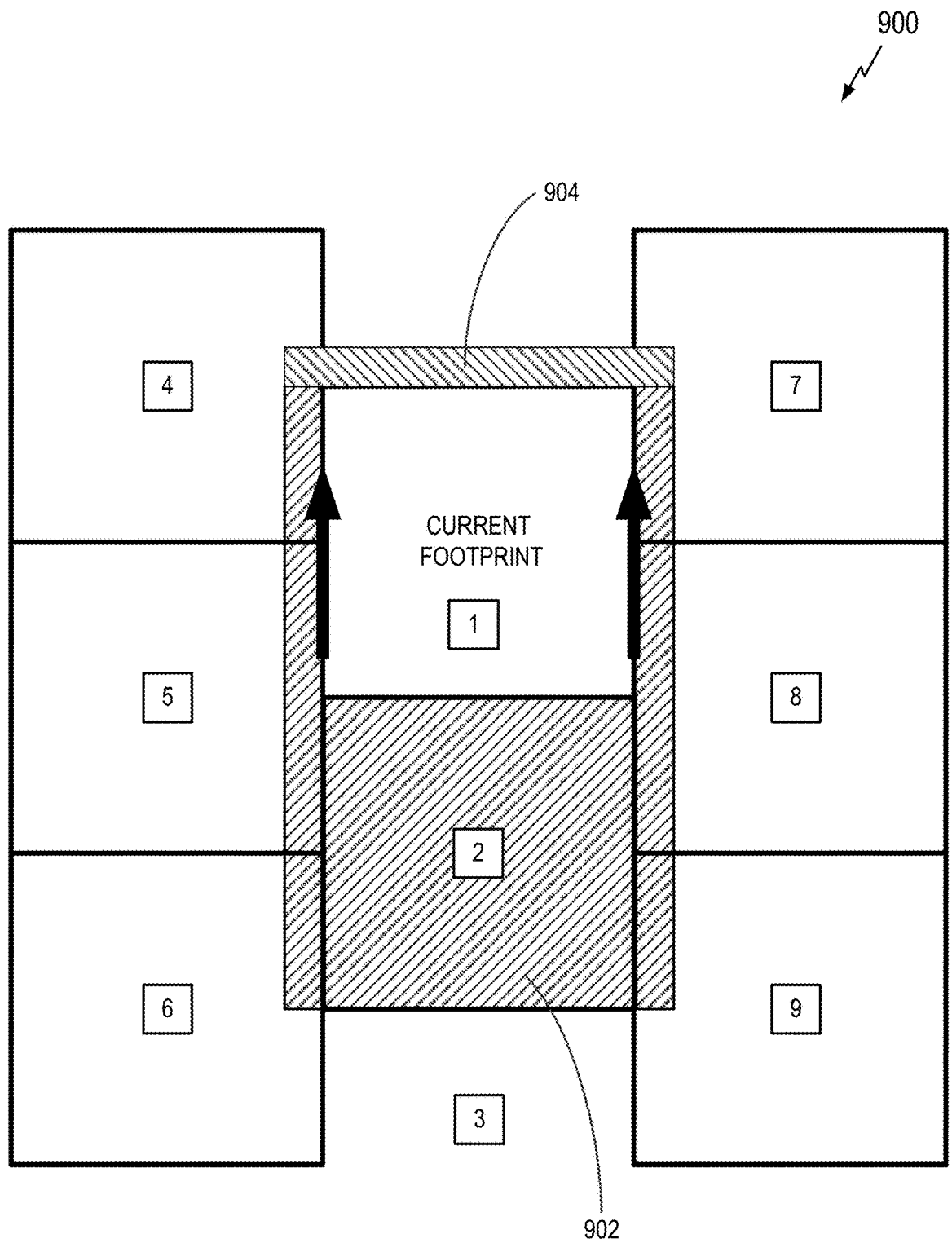
FIG. 9 is a diagram of example satellite footprints in accordance with some aspects of the disclosure.
Figure 10:
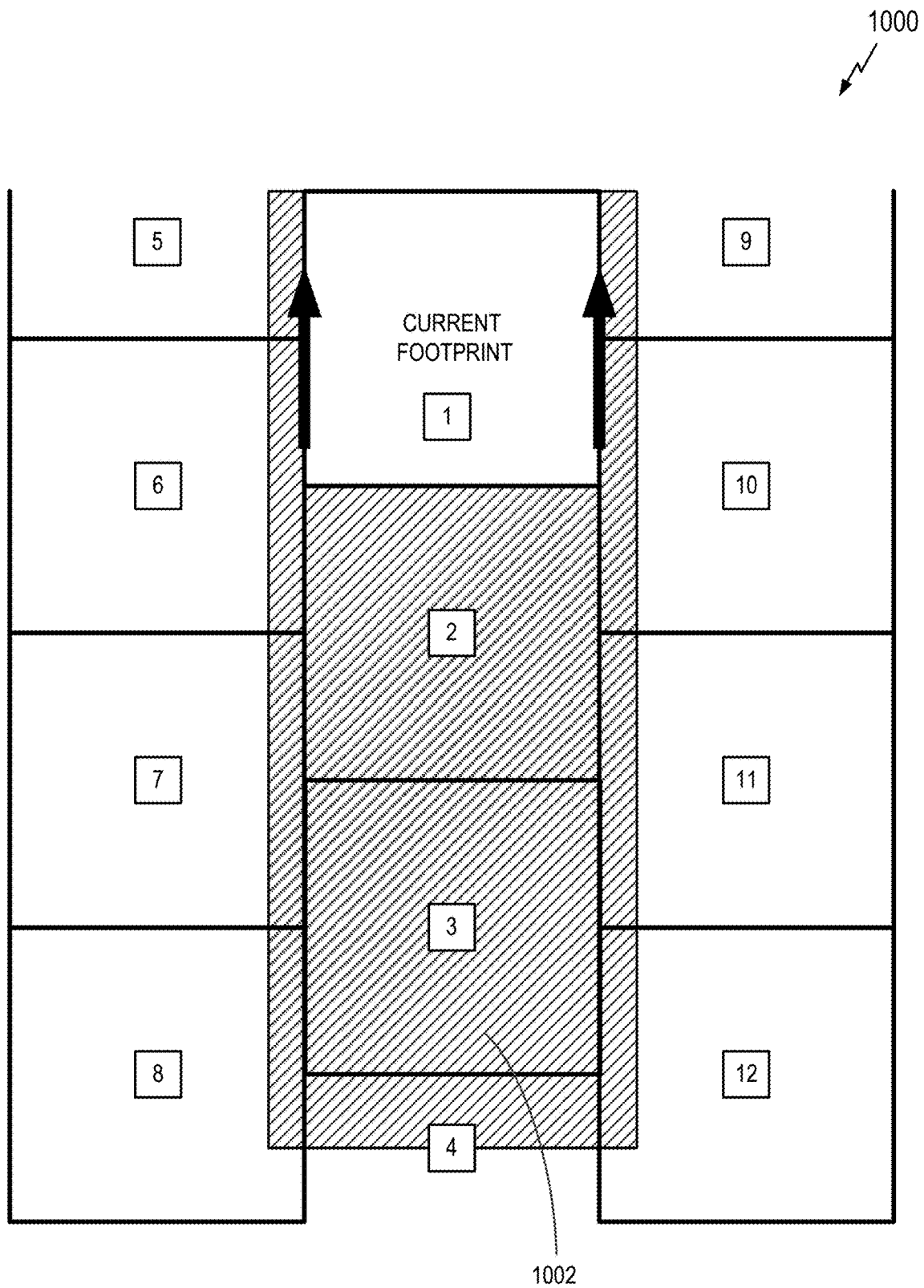
FIG. 10 is a diagram of example satellite footprints in accordance with some aspects of the disclosure.

Referring now to the set of footprints 900 in FIG. 9, the shaded areas 902 indicate the possible locations for the UTs in the footprint of the current satellite in the next 3 minutes.

The shaded areas 904 indicate the locations where a UT in the footprint of the current satellite would not reach (e.g., because the satellite's footprint moves much faster than a UT).

The above examples can be extended to, for example, 6 minutes of coverage. In this case the number of satellites may be 12, as shown in the set of footprints 1000 in FIG. 10. In practice, ephemeris information for the satellites indicated for FIG. 9 or FIG. 10 would typically be broadcast since this covers either static or moving UTs. In this case, ephemeris information for the satellites indicated for FIG. 8 for static UTs could still be unicast (e.g., to reduce the signaling overhead).

The geographical width of a plane reduces towards the poles and therefore the number of visible satellites increases with altitude as mentioned above. Appropriate examples can be constructed for those scenarios based on the principles discussed herein.

Broadcast Overhead

Assuming a "refresh time" of 6 minutes, the number of satellites included in the ephemeris information may be 12 near the equator. This amounts to, for example, 12*24=288 bytes.

The number of Airlink Resource Units (e.g., comprising time units and/or frequency units) required to carry this information at −10 dB SNR may be 173, effectively resulting in an overhead of approximately 34 Airlink Resource Units per second (0.003%) assuming a periodicity of 5.12 seconds.

At near 60° latitude, this number could go up to 24 satellites, amounting to 576 bytes and requiring 343 Airlink Resource Units per second (an overhead of 0.006%) as one example.

Operation Near the Seams

A "seam" is a location where the motions of the satellites in two neighbouring planes are in the opposite directions, i.e., where the north-bound and south-bound satellites are next to each other. In an example implementation, there may be two seams in the system.

The satellites to be included near the "seams" may be a mirror image of those that would have been included had the motion of the 'different' plane also been in the same direction.

Figure 11:
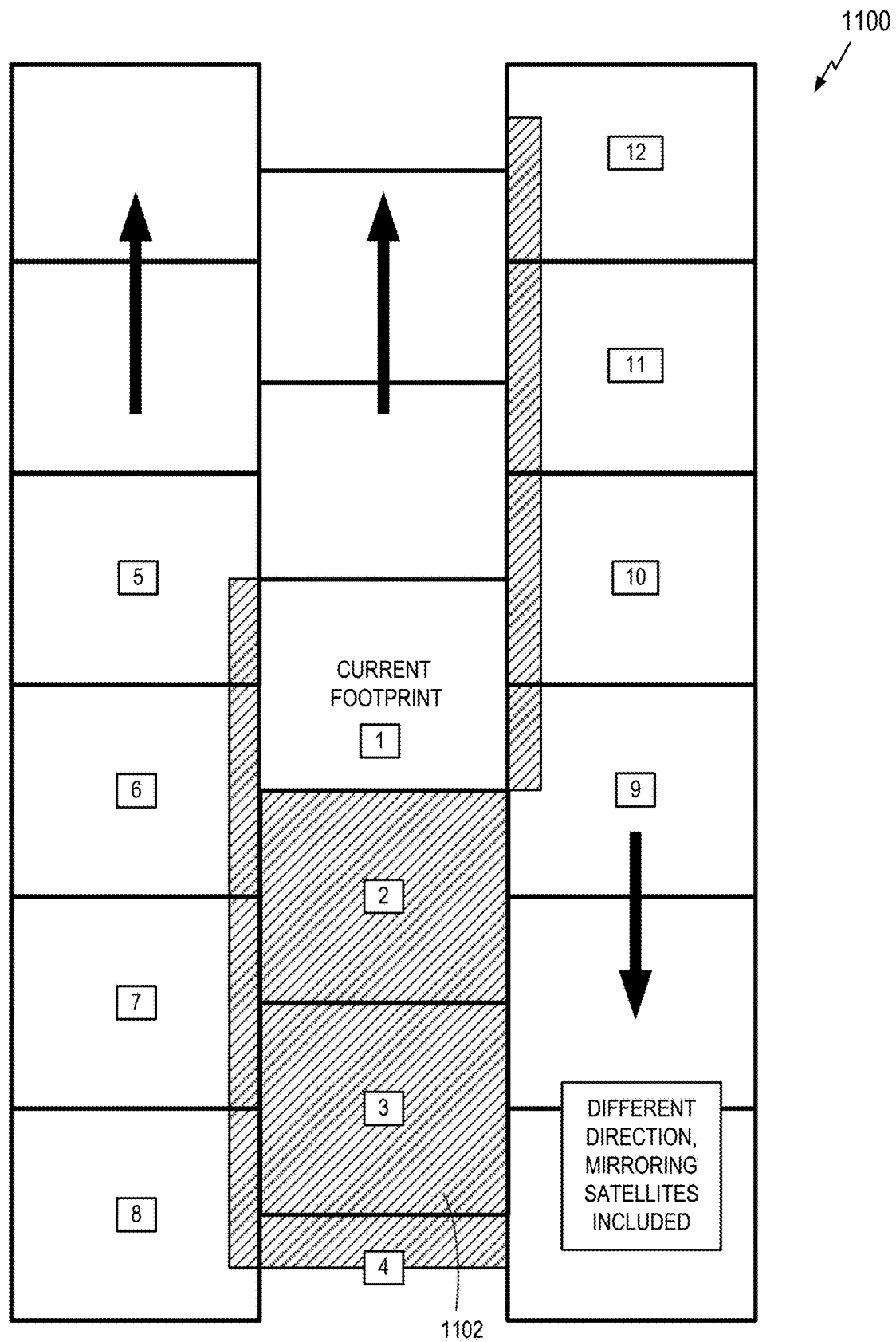
FIG. 11 is a diagram of example satellite footprints in accordance with some aspects of the disclosure.

FIG. 11 illustrates an example of set of footprints 1100 of the satellites to be included in the ephemeris information list for the operation near the seams. The shaded area 1102 indicate the possible locations for the UTs in the footprint of the current satellite in the next 6 minutes.

Example Parameters

The length of the Satellite List (in the BIB) may be 1 . . . 256 in an example implementation. The proposed value for the initial system setup may be 12, worth 6 minutes near equator. At the maximum capacity of 256 satellites a "refresh period" of about 250 minutes can be attained near the equator (approximately 125 minutes near 60° latitude). The length of the Satellite List in the unicast message "Radio Ephemeris Information" may be 1 . . . 4096.

The range for the BIBe Refresh Time (in the BIB) may be {30*(0 . . . 255) seconds)}. An example value for the initial setup is 12 (i.e., 360 seconds or 6 minutes). In some implementations, it may be assumed that it is neither necessary nor desirable to broadcast the ephemeris information for a larger "refresh time." The range for the BIBe Refresh Time in the unicast message "Radio Ephemeris Information" may also be the same.

Reception Operation

When the UT receives the ephemeris information in the BIBe or in the Radio Ephemeris Information message, the UT starts a timer with a duration equal to the indicated "refresh period," and the next BIBe reading is completed before the timer expires. If the value of the "refresh period" is set to 0, the UT keeps attempting to read the BIBe at the next scheduled occasions (e.g., frames) indicated by the BIB1. If it becomes known to the UT that the BIBe reading cannot be completed within the "refresh period", the UT requests the SNP for unicast transfer of the ephemeris information by sending a "Radio Ephemeris Information Request" message.

The UT can request the SNP for the ephemeris information in the "Radio Ephemeris Information Request" message, when needed. This could be needed due to, for example, half-duplex operation of connected mode UTs (e.g., a half-duplex UT may be unable to receive a broadcast or unicast message when the UT is transmitting) or any other unforeseen reason. A recently powered-on UT may request the SNP for the transfer of ephemeris information for the full constellation.

The SNP can, on its own, unicast the ephemeris information in the "Radio Ephemeris Information" message, when needed. One possible reason for the SNP unilaterally unicasting this information could be to proactively transfer the ephemeris information to those connected UTs that are going to be actively transmitting for some time. This could also be done due to any unforeseen reason. This unilateral unicasting may be a backup mechanism in some implementations.

Storage Operation

The UT may maintain a database of ephemeris information for all satellites, indexed by their satellite identities.

When the UT receives the ephemeris information for a satellite, if an entry is not present for that satellite in the database, the UT may create an entry in its database and store the received information for that satellite there. If the ephemeris information for that satellite is already stored in the database, the UT may overwrite that existing information with the received information.

The UT may keep the ephemeris information for a satellite stored in its database for a minimum period of time (e.g., due to a failed satellite) unless it is overwritten with freshly received ephemeris information. In some implementations, the minimum period of time is 15 days. Other periods of time could be used in other implementations.

If the UT receives the ephemeris information for the full constellation, the UT may discard its complete existing ephemeris database and replace it with the received information.

A UT may obtain ephemeris information in other ways. As one example, ephemeris information could be loaded into the UT (e.g., using a thumb-drive, via the Internet, via a software update, etc.).

First Example Apparatus

Figure 12:
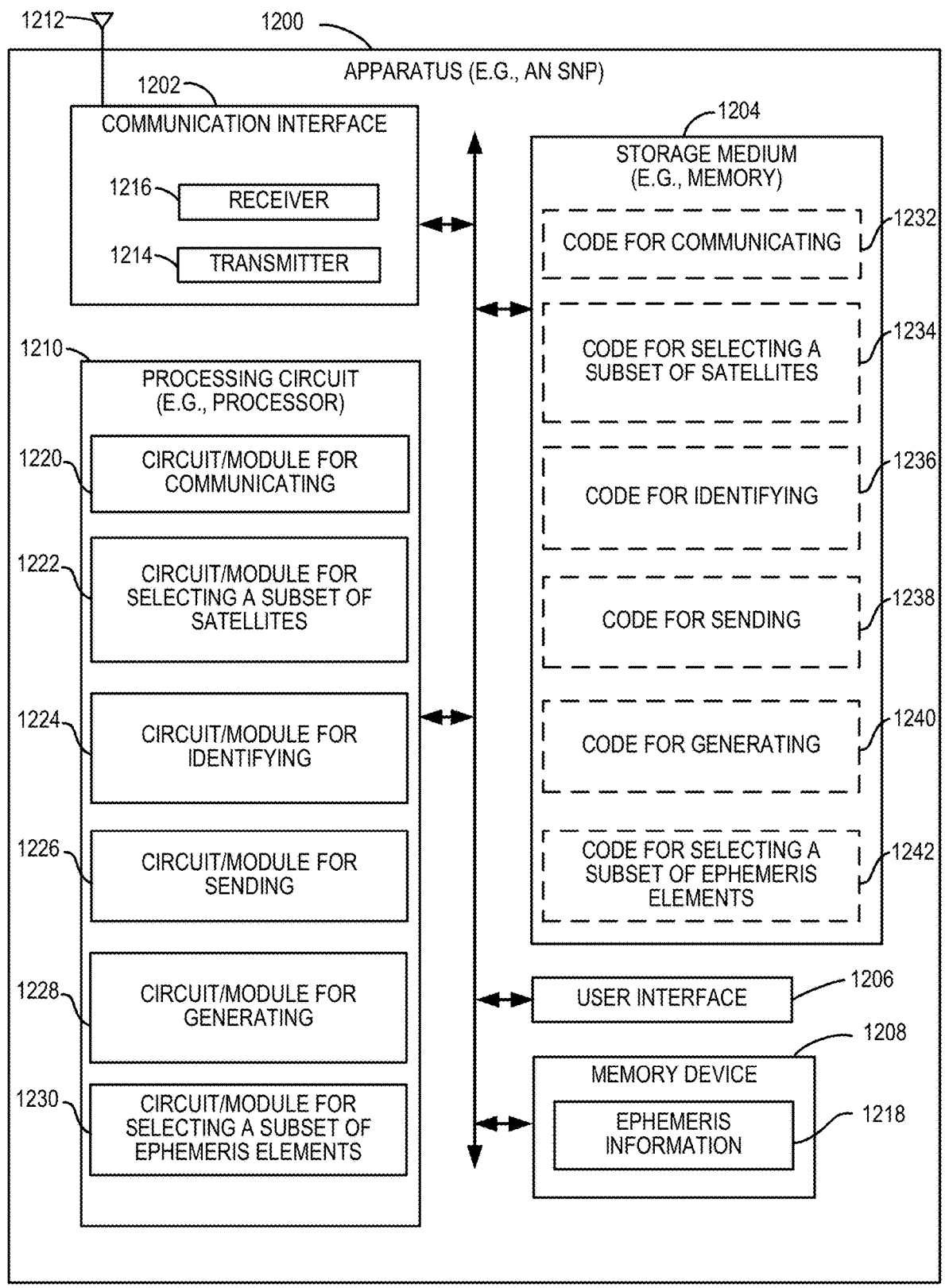
FIG. 12 is a block diagram illustrating an example hardware implementation for an apparatus (e.g., an electronic device) that can support ephemeris information management in accordance with some aspects of the disclosure.

FIG. 12 illustrates a block diagram of an example hardware implementation of an apparatus 1200 configured to communicate according to one or more aspects of the disclosure. For example, the apparatus 1200 could embody or be implemented within an SNP, or some other type of device that supports satellite communication. In various implementations, the apparatus 1200 could embody or be implemented within a gateway, a ground station, a vehicular component, or any other electronic device having circuitry.

The apparatus 1200 includes a communication interface (e.g., at least one transceiver) 1202, a storage medium 1204, a user interface 1206, a memory device (e.g., a memory circuit) 1208, and a processing circuit (e.g., at least one processor) 1210. In various implementations, the user interface 1206 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 12. The signaling bus may include any number of interconnecting buses and bridges depending on the specific application of the processing circuit 1210 and the overall design constraints. The signaling bus links together various circuits such that each of the communication interface 1202, the storage medium 1204, the user interface 1206, and the memory device 1208 are coupled to and/or in electrical communication with the processing circuit 1210. The signaling bus may also link various other circuits (not shown) such as timing sources, peripherals, voltage regulators, and power management circuits, which are well known in the art, and therefore, will not be described any further.

The communication interface 1202 provides a means for communicating with other apparatuses over a transmission medium. In some implementations, the communication interface 1202 includes circuitry and/or programming adapted to facilitate the communication of information bi-directionally with respect to one or more communication devices in a network. In some implementations, the communication interface 1202 is adapted to facilitate wireless communication of the apparatus 1200. In these implementations, the communication interface 1202 may be coupled to one or more antennas 1212 as shown in FIG. 12 for wireless communication within a wireless communication system. The communication interface 1202 can be configured with one or more standalone receivers and/or transmitters, as well as one or more transceivers. In the illustrated example, the communication interface 1202 includes a transmitter 1214 and a receiver 1216. The communication interface 1202 serves as one example of a means for receiving and/or means transmitting.

The memory device 1208 may represent one or more memory devices. As indicated, the memory device 1208 may maintain ephemeris information 1218 along with other information used by the apparatus 1200. In some implementations, the memory device 1208 and the storage medium 1204 are implemented as a common memory component. The memory device 1208 may also be used for storing data that is manipulated by the processing circuit 1210 or some other component of the apparatus 1200.

The storage medium 1204 may represent one or more computer-readable, machine-readable, and/or processor-readable devices for storing programming, such as processor executable code or instructions (e.g., software, firmware), electronic data, databases, or other digital information. The storage medium 1204 may also be used for storing data that is manipulated by the processing circuit 1210 when executing programming. The storage medium 1204 may be any available media that can be accessed by a general purpose or special purpose processor, including portable or fixed storage devices, optical storage devices, and various other mediums capable of storing, containing or carrying programming.

By way of example and not limitation, the storage medium 1204 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1204 may be embodied in an article of manufacture (e.g., a computer program product). By way of example, a computer program product may include a computer-readable medium in packaging materials. In view of the above, in some implementations, the storage medium 1204 may be a non-transitory (e.g., tangible) storage medium.

The storage medium 1204 may be coupled to the processing circuit 1210 such that the processing circuit 1210 can read information from, and write information to, the storage medium 1204. That is, the storage medium 1204 can be coupled to the processing circuit 1210 so that the storage medium 1204 is at least accessible by the processing circuit 1210, including examples where at least one storage medium is integral to the processing circuit 1210 and/or examples where at least one storage medium is separate from the processing circuit 1210 (e.g., resident in the apparatus 1200, external to the apparatus 1200, distributed across multiple entities, etc.).

Programming stored on the storage medium 1204, when executed by the processing circuit 1210, causes the processing circuit 1210 to perform one or more of the various functions and/or process operations described herein. For example, the storage medium 1204 may include operations configured for regulating operations at one or more hardware blocks of the processing circuit 1210, as well as to utilize the communication interface 1202 for wireless communication utilizing their respective communication protocols.

The processing circuit 1210 is generally adapted for processing, including the execution of such programming stored on the storage medium 1204. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1210 is arranged to obtain, process and/or send data, control data access and storage, issue commands, and control other desired operations. The processing circuit 1210 may include circuitry configured to implement desired programming provided by appropriate media in at least one example. For example, the processing circuit 1210 may be implemented as one or more processors, one or more controllers, and/or other structure configured to execute executable programming. Examples of the processing circuit 1210 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1210 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1210 are for illustration and other suitable configurations within the scope of the disclosure are also contemplated.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described with respect to FIGS. 13-17. As used herein, the term "adapted" in relation to the processing circuit 1210 may refer to the processing circuit 1210 being one or more of configured, employed, implemented, and/or programmed to perform a particular process, function, operation and/or routine according to various features described herein.

The processing circuit 1210 may be a specialized processor, such as an application specific integrated circuit (ASIC) that serves as a means for (e.g., structure for) carrying out any one of the operations described in conjunction with FIGS. 13-17. The processing circuit 1210 serves as one example of a means for transmitting and/or a means for receiving. In some implementations, the processing circuit 1210 incorporates the functionality of the SNP controller 250 of FIG. 2.

According to at least one example of the apparatus 1200, the processing circuit 1210 may include one or more of a circuit/module for communicating 1220, a circuit/module for selecting a subset of satellites 1222, a circuit/module for identifying 1224, a circuit/module for sending 1226, a circuit/module for generating 1228, a circuit/module for selecting a subset of ephemeris elements 1230. In various implementations, the circuit/module for communicating 1220, the circuit/module for selecting a subset of satellites 1222, the circuit/module for identifying 1224, the circuit/module for sending 1226, the circuit/module for generating 1228, or the circuit/module for selecting a subset of ephemeris elements 1230 may correspond, at least in part, to the SNP controller 250 of FIG. 2.

The circuit/module for communicating 1220 may include circuitry and/or programming (e.g., code for communicating 1232, with this code being stored on the storage medium 1204) adapted to perform several functions relating to, for example, communicating information. In some implementations, the information is UT location information. In some implementations, the communication involves receiving. In some implementations, the communication involves sending (e.g., transmitting). In some implementations, the information is a request. In some implementations, the information is a response. In some implementations, the information is satellite ephemeris information. In some implementations, the information is an indication.

In some scenarios, the communicating involves the circuit/module for communicating 1220 receiving information directly from a device that transmitted the information or receiving information from a component of the apparatus 1200 (e.g., the receiver 1216, the memory device 1208, the communication interface 1202 (e.g., a digital subsystem or an RF subsystem), or some other component). In this case, the circuit/module for communicating 1220 may process (e.g., decode) the received information. The circuit/module for communicating 1220 then outputs the received information to a component of the apparatus 1200 (e.g., the memory device 1208 or some other component).

In some scenarios, the communicating involves sending information to another component of the apparatus 1200 (e.g., the transmitter 1214) for transmission to another device or sending information directly to an ultimate destination (e.g., if the circuit/module for communicating 1220 includes a transmitter). In this case, the circuit/module for communicating 1220 initially obtains information to be communicated (e.g., from the memory device 1208 or some other component). The circuit/module for communicating 1220 may process (e.g., encode) the information to be transmitted. The circuit/module for communicating 1220 then causes the information to be transmitted. For example, the circuit/module for communicating 1220 can directly transmit the information or pass the information to the transmitter 1214 or the communication interface 1202 (e.g., a digital subsystem or an RF subsystem) for subsequent radio frequency (RF) transmission.

In some implementations, the communication interface 1202 includes the circuit/module for communicating 1220 and/or the code for communicating 1232. In some implementations, the circuit/module for communicating 1220 is a transceiver. In some implementations, the circuit/module for communicating 1220 is configured to control the communication interface 1202 (e.g., a transceiver) to receive the information.

The circuit/module for selecting a subset of satellites 1222 may include circuitry and/or programming (e.g., code for selecting a subset of satellites 1234, with this code being stored on the storage medium 1204) adapted to perform several functions relating to, for example, selecting a subset of satellites based on a location of a satellite, a refresh period, or a local latitude. Initially, the circuit/module for selecting a subset of satellites 1222 receives ephemeris information and the other information (e.g., an indication of the location, the refresh period, or the local latitude) from the memory device 1208, or some other component of the apparatus 1200. In some implementations, the circuit/module for selecting a subset of satellites 1222 selects the subset by determining, based on the ephemeris information, which satellites are near that location or latitude or selects the subset (e.g., the number of satellites) based on the refresh period. The circuit/module for selecting a subset of satellites 1222 may then output an indication of this selection (e.g., to the memory device 1208 or some other component of the apparatus 1200).

The circuit/module for identifying 1224 may include circuitry and/or programming (e.g., code for identifying 1236, with this code being stored on the storage medium 1204) adapted to perform several functions relating to, for example, identifying satellite ephemeris information to be sent to a particular UT. Initially, the circuit/module for identifying 1224 receives an identifier of the UT (e.g., from the memory device 1208, or some other component of the apparatus 1200). In some implementations, the circuit/module for identifying 1224 identifies, based on the location of the UT, which satellites are near the UT. The circuit/module for identifying 1224 may then output an indication of the corresponding ephemeris information (e.g., to the memory device 1208 or some other component of the apparatus 1200).

The circuit/module for sending 1226 may include circuitry and/or programming (e.g., code for sending 1238, with this code being stored on the storage medium 1204) adapted to perform several functions relating to, for example, sending information to another apparatus (e.g., via a satellite). In some implementations, the information is ephemeris information. In some implementations, the information is ephemeris elements. Initially, the circuit/module for sending 1226 obtains the information to be sent (e.g., from the memory device 1208, the circuit/module for identifying 1224, the circuit/module for selecting 1224, or some other component). The circuit/module for sending 1226 may then format the information for sending (e.g., according to a protocol, etc.). The circuit/module for sending 1226 then causes the information to be sent via a wireless communication medium (e.g., via satellite signaling). To this end, the circuit/module for sending 1226 may send the data to the communication interface 1202 (e.g., a digital subsystem or an RF subsystem) or some other component for transmission. In some implementations, the communication interface 1202 includes the circuit/module for sending 1226 and/or the code for sending 1238. In some implementations, the circuit/module for sending 1226 is a transceiver or a transmitter. In some implementations, the circuit/module for communicating 1220 performs the functions of the circuit/module for sending 1226. In some implementations, the circuit/module for sending 1226 is configured to control the communication interface 1202 (e.g., a transceiver or a transmitter) to send the information.

The circuit/module for generating 1228 may include circuitry and/or programming (e.g., code for generating 1240, with this code being stored on the storage medium 1204) adapted to perform several functions relating to, for example, generating an indication of when a user terminal should refresh satellite ephemeris information maintained at the user terminal. Initially, the circuit/module for generating 1228 receives an identifier of the UT (e.g., from the memory device 1208, or some other component of the apparatus 1200). In some implementations, the circuit/module for generating 1228 determines, based on a refresh period or an expiry time, that the UT should re-read the BIBe. The circuit/module for generating 1228 may then output an indication of this determination (e.g., to the memory device 1208, the circuit/module for communicating 1220, or some other component of the apparatus 1200).

The circuit/module for selecting a subset of ephemeris elements 1230 may include circuitry and/or programming (e.g., code for selecting a subset of ephemeris elements 1242, with this code being stored on the storage medium 1204) adapted to perform several functions relating to, for example, selecting a subset of ephemeris elements from a set of ephemeris elements. Initially, the circuit/module for selecting a subset of ephemeris elements 1230 receives ephemeris information and the other information (e.g., an indication of a UT location, an indication of the members of the subset, etc.) from the memory device 1208, or some other component of the apparatus 1200. In some implementations, the circuit/module for selecting a subset of ephemeris elements 1230 selects the subset based on this information. The circuit/module for selecting a subset of ephemeris elements 1230 may then output an indication of this selection (e.g., to the memory device 1208, the circuit/module for sending 1226, or some other component of the apparatus 1200).

As mentioned above, programming stored on the storage medium 1204, when executed by the processing circuit 1210, causes the processing circuit 1210 to perform one or more of the various functions and/or process operations described herein. For example, the programming, when executed by the processing circuit 1210, may cause the processing circuit 1210 to perform the various functions, steps, and/or processes described herein with respect to FIGS. 13-17 in various implementations. As shown in FIG. 12, the storage medium 1204 may include one or more of the code for communicating 1232, the code for selecting a subset of satellites 1234, the code for identifying 1236, the code for sending 1238, the code for generating 1240, or the code for selecting a subset of ephemeris elements 1242.

First Example Process

Figure 13:
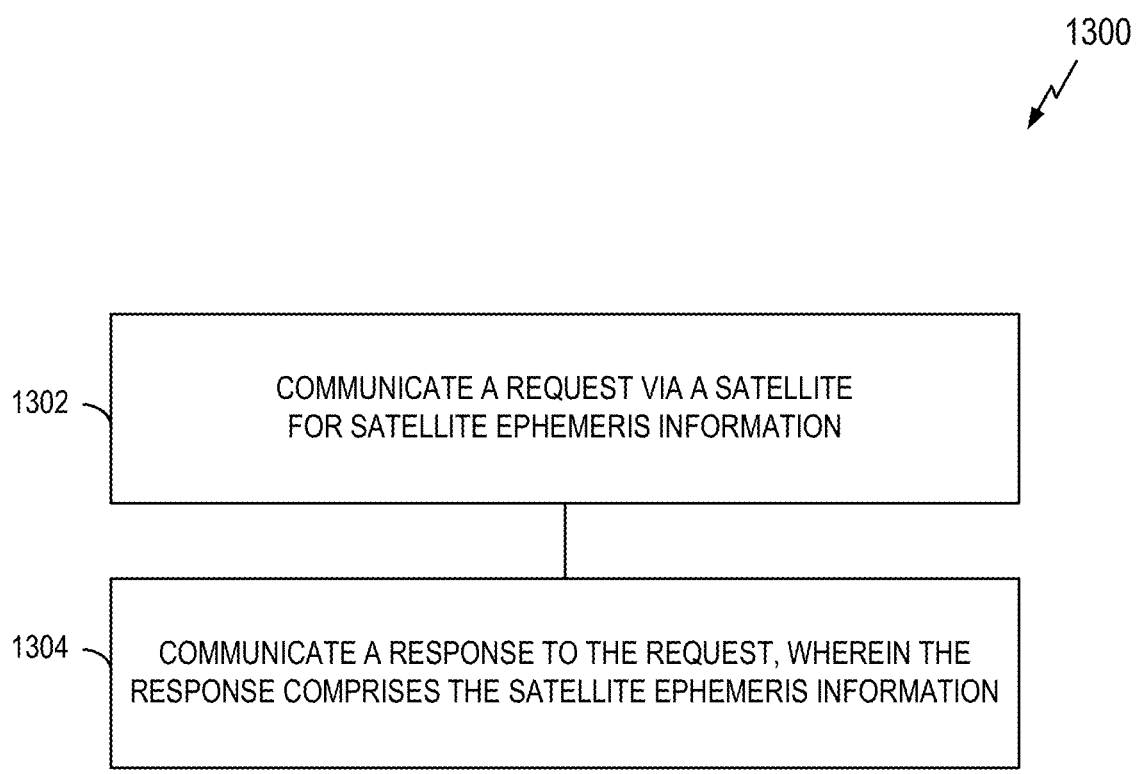
FIG. 13 is a flowchart illustrating an example of a process for communicating ephemeris information in accordance with some aspects of the disclosure.

FIG. 13 illustrates a process 1300 for communication in accordance with some aspects of the disclosure. The process 1300 may take place within a processing circuit (e.g., the processing circuit 1210 of FIG. 12), which may be located in an SNP or some other suitable apparatus. In some implementations, the process 1300 may be performed by an SNP for at least one non-geosynchronous satellite. Of course, in various aspects within the scope of the disclosure, the process 1300 may be implemented by any suitable apparatus capable of supporting communication operations.

At block 1302, an apparatus (e.g., an SNP) communicates (e.g., receives) a request for satellite ephemeris information. In some scenarios, the request may specify whether it is for the full ephemeris information (for all of the satellites in the constellation) or for a part (e.g., a subset) of the full ephemeris information (for a corresponding part of the satellites in the constellation). In some implementations, the circuit/module for communicating 1220 of FIG. 12 performs the operations of block 1302. In some implementations, the code for communicating 1232 of FIG. 12 is executed to perform the operations of block 1302.

At block 1304, the apparatus communicates (e.g., sends) a response to the request, wherein the response comprises the satellite ephemeris information. In some scenarios where the request of block 1302 specifies the requested information (e.g., full or subset), the response will only include the requested information. In some implementations, the circuit/module for communicating 1220 of FIG. 12 performs the operations of block 1304. In some implementations, the code for communicating 1232 of FIG. 12 is executed to perform the operations of block 1304.

In some aspects, the satellite ephemeris information consists of a quantity of ephemeris information elements. A first subset of the ephemeris information elements may be for satellite identifier and epoch time information, while a second subset of the ephemeris information elements is for elements of ephemeris other than satellite identifier and epoch time information (e.g., essential elements of ephemeris). In some aspects, each ephemeris information element of the second subset consists of, at most, three bytes of data or, at most, two bytes of data.

Second Example Process

Figure 14:
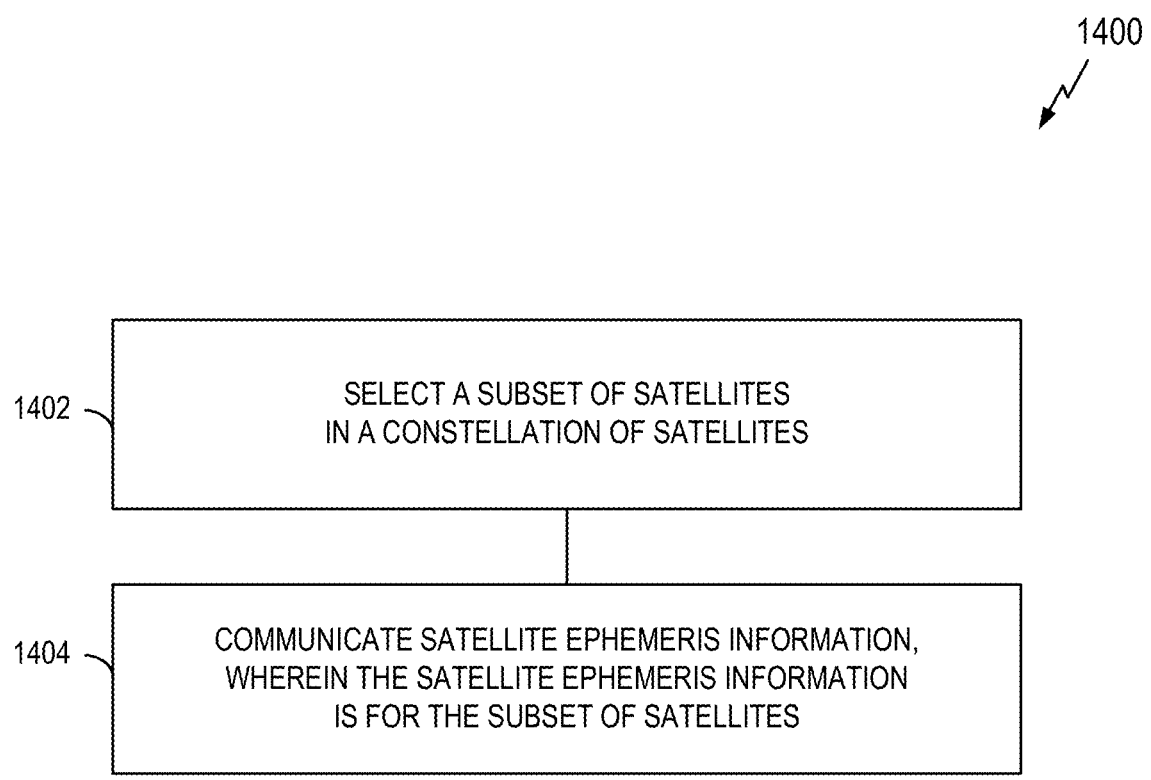
FIG. 14 is a flowchart illustrating an example of a process for communicating ephemeris information for a subset of satellites in accordance with some aspects of the disclosure.

FIG. 14 illustrates a process 1400 for communication in accordance with some aspects of the disclosure. In some aspects, the process 1400 may be performed in conjunction with (e.g., as part of or in addition to) the process 1300 of FIG. 13. The process 1400 may take place within a processing circuit (e.g., the processing circuit 1210 of FIG. 12), which may be located in an SNP or some other suitable apparatus. In some implementations, the process 1400 may be performed by an SNP for at least one non-geosynchronous satellite. Of course, in various aspects within the scope of the disclosure, the process 1400 may be implemented by any suitable apparatus capable of supporting communication operations.

At block 1402, an apparatus (e.g., an SNP) selects a subset of satellites in a constellation of satellites. For example, the satellites may be selected based on at least one of: a location of a satellite that transmits (e.g., relays) satellite ephemeris information (e.g., for a subset of satellites), a refresh period for at least one user terminal, a local latitude, or any combination thereof. In some aspects, the refresh period may correspond to a time for re-reading a BIBe. In some implementations, the circuit/module for selecting a subset of satellites 1222 of FIG. 12 performs the operations of block 1402. In some implementations, the code for selecting a subset of satellites 1234 of FIG. 12 is executed to perform the operations of block 1304.

At block 1404, the apparatus communicates a message comprising satellite ephemeris information. In some aspects, the satellite ephemeris information may be for the subset of satellites. In some aspects, the communication may be a response to a request for the satellite ephemeris information. In some aspects, the communicating of the satellite ephemeris information at block 1404 may include at least one of: broadcasting the satellite ephemeris information, sending the satellite ephemeris information via a unicast message, or any combination thereof. In some implementations, the circuit/module for communicating 1220 of FIG. 12 performs the operations of block 1404. In some implementations, the code for communicating 1232 of FIG. 12 is executed to perform the operations of block 1404.

Third Example Process

Figure 15:
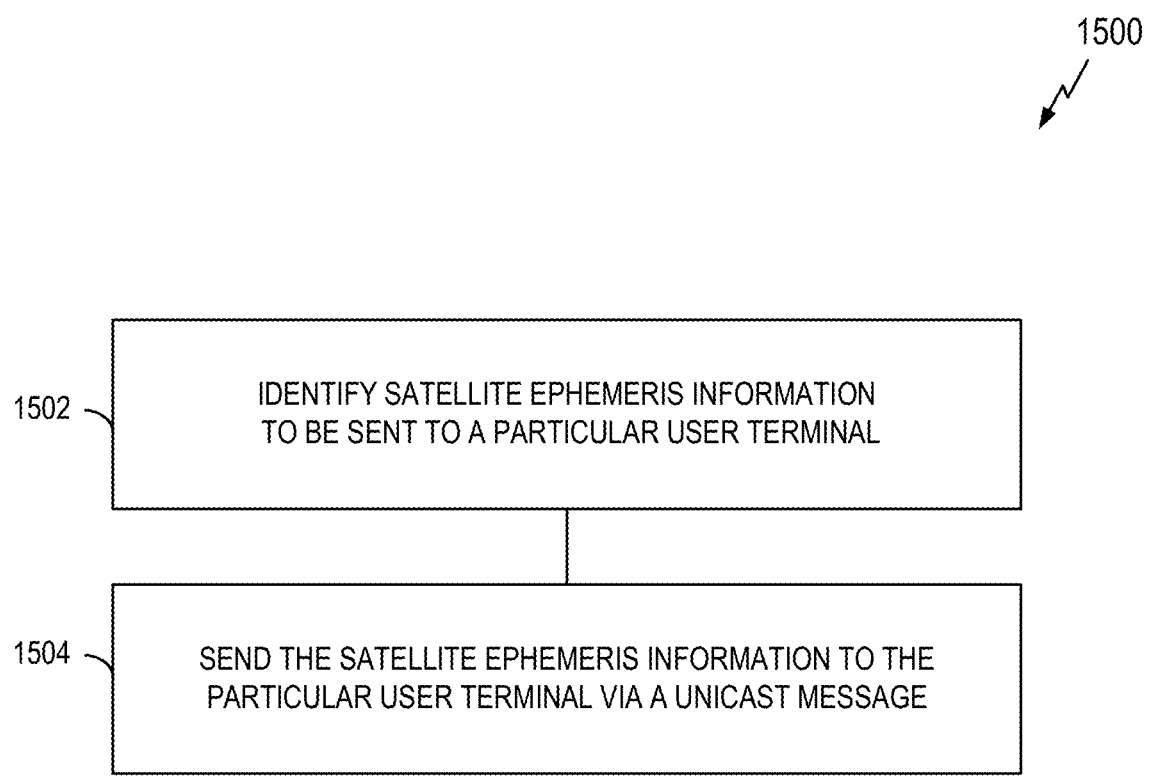
FIG. 15 is a flowchart illustrating an example of a process for communicating a unicast message in accordance with some aspects of the disclosure.

FIG. 15 illustrates a process 1500 for communication in accordance with some aspects of the disclosure. In some aspects, the process 1500 may be performed in conjunction with (e.g., as part of or in addition to) the process 1300 of FIG. 13. The process 1500 may take place within a processing circuit (e.g., the processing circuit 1210 of FIG. 12), which may be located in an SNP or some other suitable apparatus. In some implementations, the process 1500 may be performed by an SNP for at least one non-geosynchronous satellite. Of course, in various aspects within the scope of the disclosure, the process 1500 may be implemented by any suitable apparatus capable of supporting communication operations.

At block 1502, an apparatus (e.g., an SNP) identifies satellite ephemeris information (e.g., other satellite ephemeris information) to be sent to a particular user terminal. In some scenarios, the identified information may be the full ephemeris information (for all of the satellites in the constellation) or for a subset of the full ephemeris information (for a subset of the satellites in the constellation). In some implementations, the circuit/module for identifying 1224 of FIG. 12 performs the operations of block 1502. In some implementations, the code for identifying 1236 of FIG. 12 is executed to perform the operations of block 1502.

At block 1504, the apparatus sends the satellite ephemeris information to the particular user terminal via a unicast message. In some implementations, the circuit/module for sending 1226 of FIG. 12 performs the operations of block 1504. In some implementations, the code for sending 1238 of FIG. 12 is executed to perform the operations of block 1504.

Fourth Example Process

Figure 16:
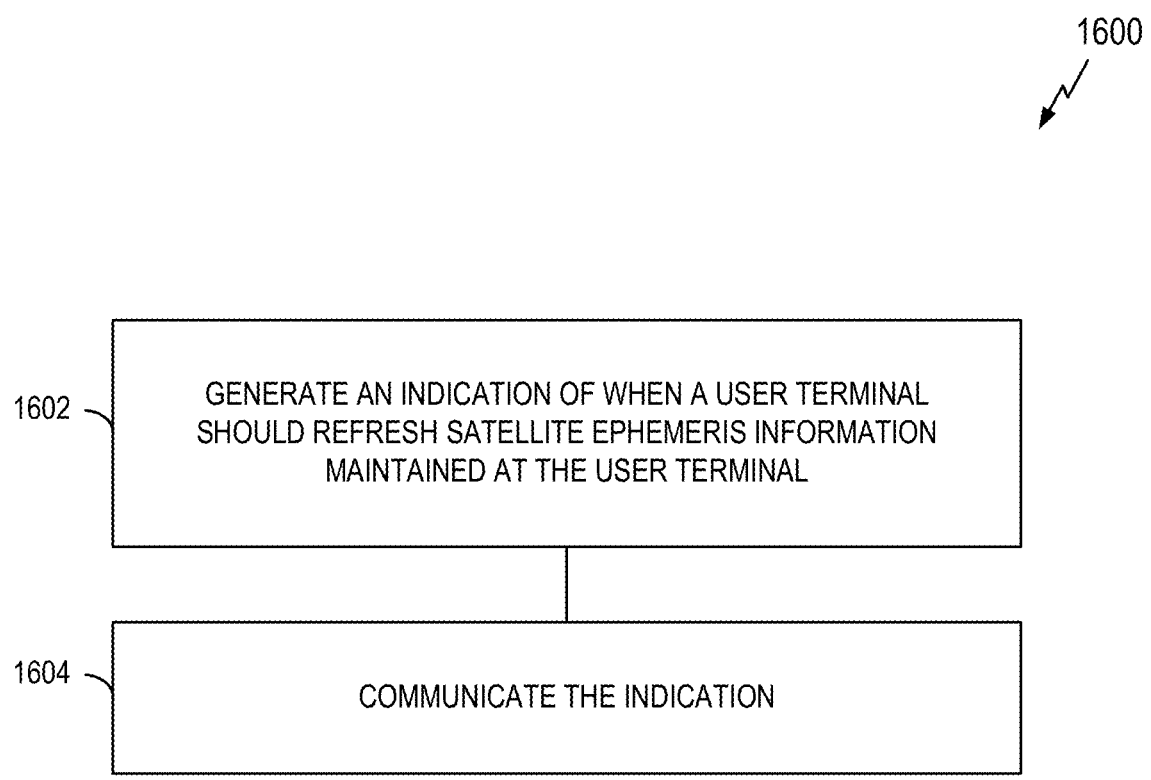
FIG. 16 is a flowchart illustrating an example of a process for communicating an indication of when a user terminal should refresh ephemeris information in accordance with some aspects of the disclosure.

FIG. 16 illustrates a process 1600 for communication in accordance with some aspects of the disclosure. In some aspects, the process 1600 may be performed in conjunction with (e.g., as part of or in addition to) the process 1300 of FIG. 13. The process 1600 may take place within a processing circuit (e.g., the processing circuit 1210 of FIG. 12), which may be located in an SNP or some other suitable apparatus. In some implementations, the process 1600 may be performed by an SNP for at least one non-geosynchronous satellite. Of course, in various aspects within the scope of the disclosure, the process 1600 may be implemented by any suitable apparatus capable of supporting communication operations.

At block 1602, an apparatus (e.g., an SNP) generates an indication of when a user terminal should refresh satellite ephemeris information (e.g., other satellite ephemeris information) maintained at the user terminal. In some aspects, refreshing the satellite ephemeris information may include re-reading a BIBe. In some implementations, the circuit/module for generating 1228 of FIG. 12 performs the operations of block 1602. In some implementations, the code for generating 1240 of FIG. 12 is executed to perform the operations of block 1602.

At block 1604, an apparatus (e.g., an SNP) communicates (e.g., sends) the indication generated at block 1602. In some implementations, the circuit/module for communicating 1220 of FIG. 12 performs the operations of block 1604. In some implementations, the code for communicating 1232 of FIG. 12 is executed to perform the operations of block 1604.

Fifth Example Process

Figure 17:
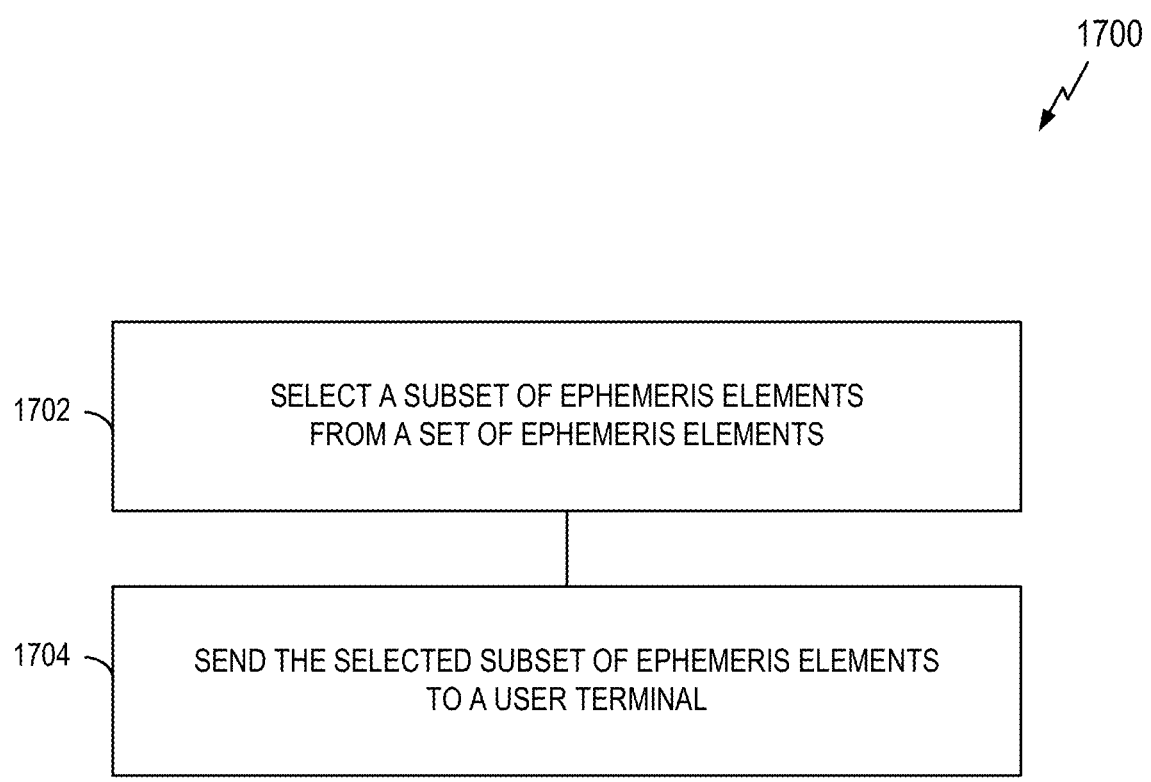
FIG. 17 is a flowchart illustrating an example of a process for sending a subset of ephemeris elements to a user terminal in accordance with some aspects of the disclosure.

FIG. 17 illustrates a process 1700 for communication in accordance with some aspects of the disclosure. In some aspects, the process 1700 may be performed in conjunction with (e.g., as part of or in addition to) the process 1300 of FIG. 13. The process 1700 may take place within a processing circuit (e.g., the processing circuit 1210 of FIG. 12), which may be located in an SNP or some other suitable apparatus. In some implementations, the process 1700 may be performed by an SNP for at least one non-geosynchronous satellite. Of course, in various aspects within the scope of the disclosure, the process 1700 may be implemented by any suitable apparatus capable of supporting communication operations.

At block 1702, an apparatus (e.g., an SNP) selects a subset of ephemeris elements from a set of ephemeris elements. In some implementations, the circuit/module for selecting a subset of ephemeris elements 1230 of FIG. 12 performs the operations of block 1702. In some implementations, the code for selecting a subset of ephemeris elements 1240 of FIG. 12 is executed to perform the operations of block 1702.

At block 1704, an apparatus (e.g., an SNP) sends the selected subset of ephemeris elements to a user terminal. In some implementations, the circuit/module for sending 1226 of FIG. 12 performs the operations of block 1704. In some implementations, the code for sending 1238 of FIG. 12 is executed to perform the operations of block 1704.

Second Example Apparatus

Figure 18:
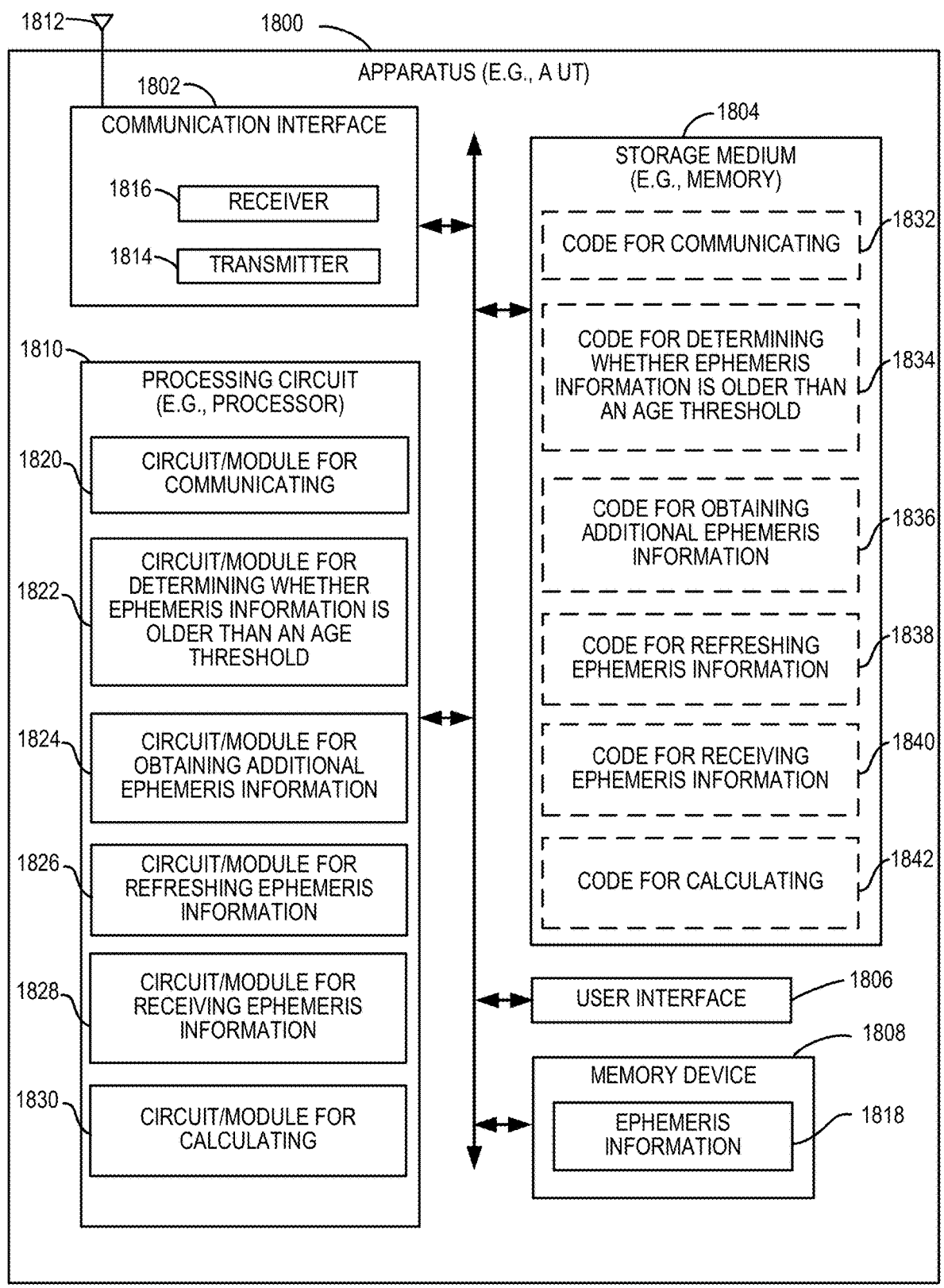
FIG. 18 is a block diagram illustrating an example hardware implementation for another apparatus (e.g., an electronic device) that can support ephemeris information management in accordance with some aspects of the disclosure.

FIG. 18 illustrates a block diagram of an example hardware implementation of another apparatus 1800 configured to communicate according to one or more aspects of the disclosure. For example, the apparatus 1800 could embody or be implemented within a UT or some other type of device that supports satellite communication. In various implementations, the apparatus 1800 could embody or be implemented within a vehicular component, or any other electronic device having circuitry.

The apparatus 1800 includes a communication interface (e.g., at least one transceiver) 1802, a storage medium 1804, a user interface 1806, a memory device 1808 (e.g., storing ephemeris information 1818), and a processing circuit (e.g., at least one processor) 1810. In various implementations, the user interface 1806 may include one or more of: a keypad, a display, a speaker, a microphone, a touchscreen display, of some other circuitry for receiving an input from or sending an output to a user. The communication interface 1802 may be coupled to one or more antennas 1812, and may include a transmitter 1814 and a receiver 1816. In general, the components of FIG. 18 may be similar to corresponding components of the apparatus 1200 of FIG. 12.

According to one or more aspects of the disclosure, the processing circuit 1810 may be adapted to perform any or all of the features, processes, functions, operations and/or routines for any or all of the apparatuses described herein. For example, the processing circuit 1810 may be configured to perform any of the steps, functions, and/or processes described with respect to FIGS. 19-22. As used herein, the term "adapted" in relation to the processing circuit 1810 may refer to the processing circuit 1810 being one or more of configured, employed, implemented, and/or programmed to perform a particular process, function, operation and/or routine according to various features described herein.

The processing circuit 1810 may be a specialized processor, such as an application specific integrated circuit (ASIC) that serves as a means for (e.g., structure for) carrying out any one of the operations described in conjunction with FIGS. 19-24. The processing circuit 1810 serves as one example of a means for transmitting and/or a means for receiving. In various implementations, the processing circuit 1810 may incorporate the functionality of the control processor 420 of FIG. 4.

According to at least one example of the apparatus 1800, the processing circuit 1810 may include one or more of a circuit/module for communicating 1820, a circuit/module for determining whether ephemeris information is older than an age threshold 1822, a circuit/module for obtaining additional ephemeris information 1824, a circuit/module for refreshing ephemeris information 1826, a circuit/module for receiving ephemeris information 1828, or a circuit/module for calculating 1830. In various implementations, the circuit/module for communicating 1820, the circuit/module for determining whether ephemeris information is older than an age threshold 1822, the circuit/module for obtaining additional ephemeris information 1824, the circuit/module for refreshing ephemeris information 1826, the circuit/module for receiving ephemeris information 1828, and the circuit/module for calculating 1830 may correspond, at least in part, to the control processor 420 of FIG. 4.

The circuit/module for communicating 1820 may include circuitry and/or programming (e.g., code for communicating 1832, with this code being stored on the storage medium 1804) adapted to perform several functions relating to, for example, communicating information. In some implementations, the communication involves receiving. In some implementations, the communication involves sending (e.g., transmitting). In some implementations, the information is a request. In some implementations, the information is a response. In some implementations, the information is UT location information. In some implementations, the information is satellite ephemeris information. In some implementations, the information is an indication.

In some scenarios, the communicating involves the circuit/module for communicating 1820 receiving information directly from a device that transmitted the information or receiving information from a component of the apparatus 1800 (e.g., the receiver 1816, the memory device 1808, the communication interface 1802 (e.g., a transmitter and receiver), or some other component). In this case, the circuit/module for communicating 1820 may process (e.g., decode) the received information. The circuit/module for communicating 1820 then outputs the received information to a component of the apparatus 1800 (e.g., the memory device 1808 or some other component).

In some scenarios, the communicating involves sending information to another component of the apparatus 1800 (e.g., the transmitter 1814) for transmission to another device or sending information directly to an ultimate destination (e.g., if the circuit/module for communicating 1820 includes a transmitter). In this case, the circuit/module for communicating 1820 initially obtains information to be communicated (e.g., from the memory device 1808 or some other component). The circuit/module for communicating 1820 may process (e.g., encode) the information to be transmitted. The circuit/module for communicating 1820 then causes the information to be transmitted. For example, the circuit/module for communicating 1820 can directly transmit the information or pass the information to the transmitter 1814 or the communication interface 1802 (e.g., a transmitter and receiver) for subsequent radio frequency (RF) transmission.

In some implementations, the communication interface 1802 includes the circuit/module for communicating 1820 and/or the code for communicating 1832. In some implementations, the circuit/module for communicating 1820 is a transceiver. In some implementations, the circuit/module for communicating 1820 is configured to control the communication interface 1802 (e.g., a transceiver) to receive the information.

The circuit/module for determining whether ephemeris information is older than an age threshold 1822 may include circuitry and/or programming (e.g., code for determining whether ephemeris information is older than an age threshold 1834, with this code being stored on the storage medium 1804) adapted to perform several functions relating to, for example, determining the age of ephemeris information. Initially, the circuit/module for determining whether ephemeris information is older than an age threshold 1822 obtains the threshold and an indication of the age of the ephemeris information from the memory device 1208, or some other component of the apparatus 1200. In some implementations, the circuit/module for determining whether ephemeris information is older than an age threshold 1822 compares this age to the threshold. The circuit/module for determining whether ephemeris information is older than an age threshold 1822 may then output an indication of this comparison (e.g., to the memory device 1808, the circuit/module for obtaining additional ephemeris information 1824, or some other component of the apparatus 1800).

The circuit/module for obtaining additional ephemeris information 1824 may include circuitry and/or programming (e.g., code for obtaining additional ephemeris information 1836, with this code being stored on the storage medium 1804) adapted to perform several functions relating to, for example, requesting ephemeris information. Initially, the circuit/module for obtaining additional ephemeris information 1824 receives an indication of the determination by the circuit/module for determining whether ephemeris information is older than an age threshold 1822 (e.g., from the memory device 1208, the circuit/module for determining whether ephemeris information is older than an age threshold 1822, or some other component of the apparatus 1200). In some implementations, the circuit/module for obtaining additional ephemeris information 1824 generates a request if the information is too old. The circuit/module for obtaining additional ephemeris information 1824 may cause the request to be sent to the satellite system (e.g., by sending an indication to the memory device 1808, the circuit/module for communicating 1820, or some other component of the apparatus 1800).

The circuit/module for refreshing ephemeris information 1826 may include circuitry and/or programming (e.g., code for refreshing ephemeris information 1838, with this code being stored on the storage medium 1804) adapted to perform several functions relating to, for example, refreshing ephemeris information stored at a UT. Initially, the circuit/module for refreshing ephemeris information 1826 receives ephemeris information (e.g., from the memory device 1208 or some other component of the apparatus 1200). In some implementations, the circuit/module for obtaining additional ephemeris information 1824 obtains current ephemeris information by re-reading a BIBe. The circuit/module for refreshing ephemeris information 1826 then updates the locally stored ephemeris information (e.g., by writing to the memory device 1808 or some other component of the apparatus 1800).

The circuit/module for receiving ephemeris information 1828 may include circuitry and/or programming (e.g., code for receiving ephemeris information 1840, with this code being stored on the storage medium 1804) adapted to perform several functions relating to, for example, receiving ephemeris information at a UT. Initially, the circuit/module for receiving ephemeris information 1828 obtains received information. For example, the circuit/module for receiving ephemeris information 1828 may obtain this information from a component of the apparatus 1800 such as the communication interface 1802 (e.g., receiver), the memory device 1808, or some other component. As another example, the circuit/module for receiving ephemeris information 1828 may receive information directly from a device (e.g., a satellite) that relayed the information to the user terminal. In some implementations, the circuit/module for receiving ephemeris information 1828 identifies a memory location of a value in the memory device 1808 and invokes a read of that location. In some implementations, the circuit/module for receiving ephemeris information 1828 processes (e.g., decodes) the received information. The circuit/module for receiving ephemeris information 1828 outputs the received information (e.g., stores the received information in the memory device 1808 or sends the information to another component of the apparatus 1800). In some implementations, the communication interface 1802 includes the circuit/module for receiving ephemeris information 1828 and/or the code for receiving ephemeris information 1840. In some implementations, the circuit/module for receiving ephemeris information 1828 is a transceiver or a receiver. In some implementations, the circuit/module for receiving ephemeris information 1828 is configured to control the communication interface 1802 (e.g., a transceiver or a receiver) to receive the information.

The circuit/module for calculating 1830 may include circuitry and/or programming (e.g., code for calculating 1842, with this code being stored on the storage medium 1804) adapted to perform several functions relating to, for example, calculating an ephemeris element or rate information. Initially, the circuit/module for calculating 1830 obtains ephemeris information from the memory device 1208, the circuit/module for receiving ephemeris information 1828, or some other component of the apparatus 1200. The circuit/module for calculating 1830 then determines an ephemeris element or rate information based on the ephemeris information. The circuit/module for calculating 1830 may then output an indication of this determination (e.g., to the memory device 1808 or some other component of the apparatus 1800).

As mentioned above, programming stored by the storage medium 1804, when executed by the processing circuit 1810, causes the processing circuit 1810 to perform one or more of the various functions and/or process operations described herein. For example, the programming, when executed by the processing circuit 1810, may cause the processing circuit 1810 to perform the various functions, steps, and/or processes described herein with respect to FIGS. 19-24 in various implementations. As shown in FIG. 18, the storage medium 1804 may include one or more of the code for communicating 1832, the code for determining whether ephemeris information is older than an age threshold 1834, the code for obtaining additional ephemeris information 1836, the code for refreshing ephemeris information 1838, the code for receiving ephemeris information 1840, or the code for calculating 1842.

Sixth Example Process

Figure 19:
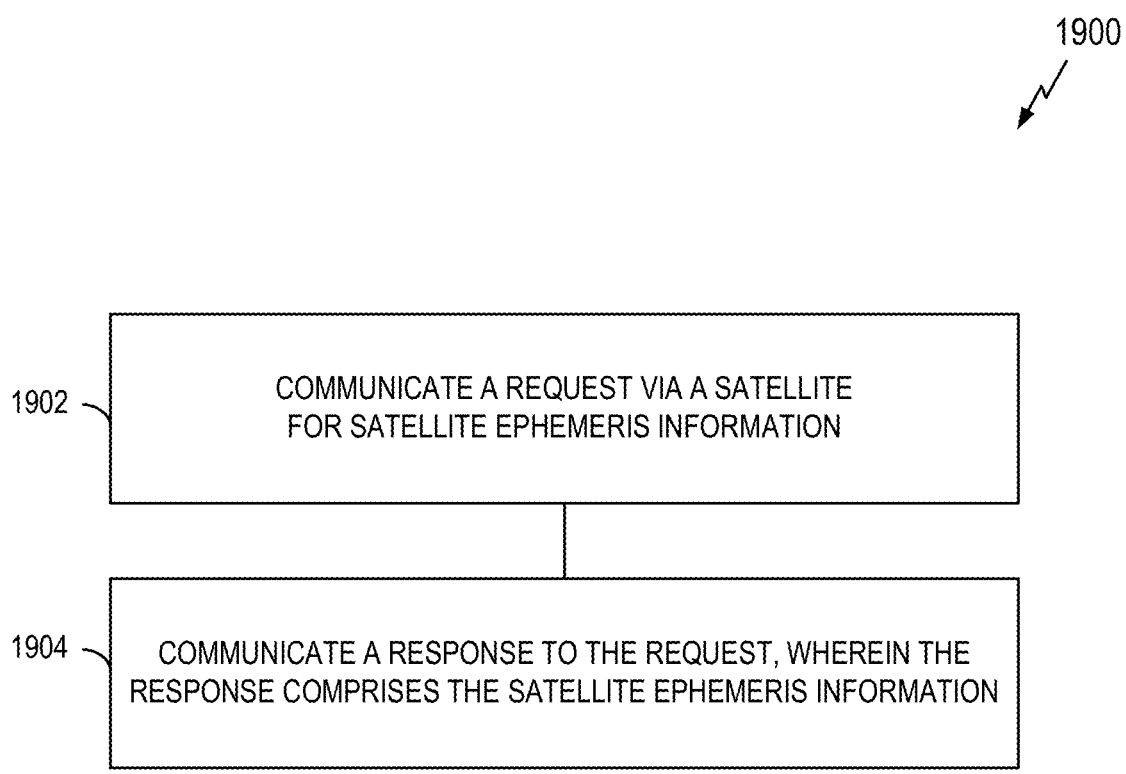
FIG. 19 is a flowchart illustrating an example of another process for communicating ephemeris information in accordance with some aspects of the disclosure.

FIG. 19 illustrates a process 1900 for communication in accordance with some aspects of the disclosure. The process 1900 may take place within a processing circuit (e.g., the processing circuit 1810 of FIG. 18), which may be located in a UT or some other suitable apparatus. Of course, in various aspects within the scope of the disclosure, the process 1900 may be implemented by any suitable apparatus capable of supporting communication operations.

At block 1902, an apparatus (e.g., a UT) communicates (e.g., sends) a request for satellite ephemeris information. In some implementations, the circuit/module for communicating 1820 of FIG. 18 performs the operations of block 1902. In some implementations, the code for communicating 1832 of FIG. 18 is executed to perform the operations of block 1902.

At block 1904, the apparatus communicates (e.g., receives) a response to the request, wherein the response comprises the satellite ephemeris information. In some implementations, the circuit/module for communicating 1820 of FIG. 18 performs the operations of block 1904. In some implementations, the code for communicating 1832 of FIG. 18 is executed to perform the operations of block 1904.

Seventh Example Process

Figure 20:
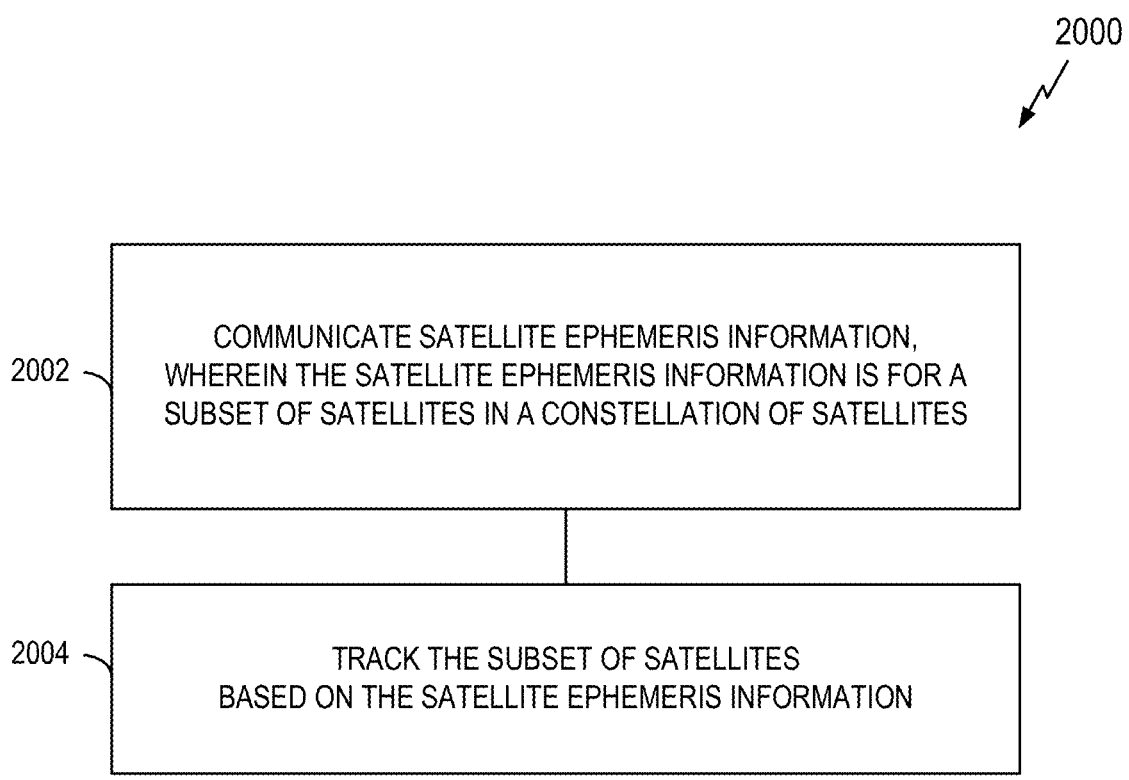
FIG. 20 is a flowchart illustrating another example of a process for communicating ephemeris information for a subset of satellites in accordance with some aspects of the disclosure.

FIG. 20 illustrates a process 2000 for communication in accordance with some aspects of the disclosure. In some aspects, the process 2000 may be performed in conjunction with (e.g., as part of or in addition to) the process 1900 of FIG. 19. The process 2000 may take place, at least in part, within a processing circuit (e.g., the processing circuit 1810 of FIG. 18), which may be located in a UT or some other suitable apparatus. Of course, in various aspects within the scope of the disclosure, the process 2000 may be implemented by any suitable apparatus capable of supporting communication operations.

At block 2002, an apparatus (e.g., a UT) communicates satellite ephemeris information. In some aspects, the satellite ephemeris information may be for a subset of satellites in a constellation of satellites. In some aspects, the communication of the satellite ephemeris information involves receiving the satellite ephemeris information at a user terminal (e.g., a UT receives a message including satellite ephemeris information). In some implementations, the circuit/module for communicating 1820 of FIG. 18 performs the operations of block 2002. In some implementations, the code for communicating 1832 of FIG. 18 is executed to perform the operations of block 2002.

At block 2004, the apparatus tracks the subset of satellites based on the satellite ephemeris information. In some implementations, the circuit/module for communicating 1820 of FIG. 18 performs the operations of block 2004. In some implementations, the code for communicating 1832 of FIG. 18 is executed to perform the operations of block 2004.

Eighth Example Process

Figure 21:
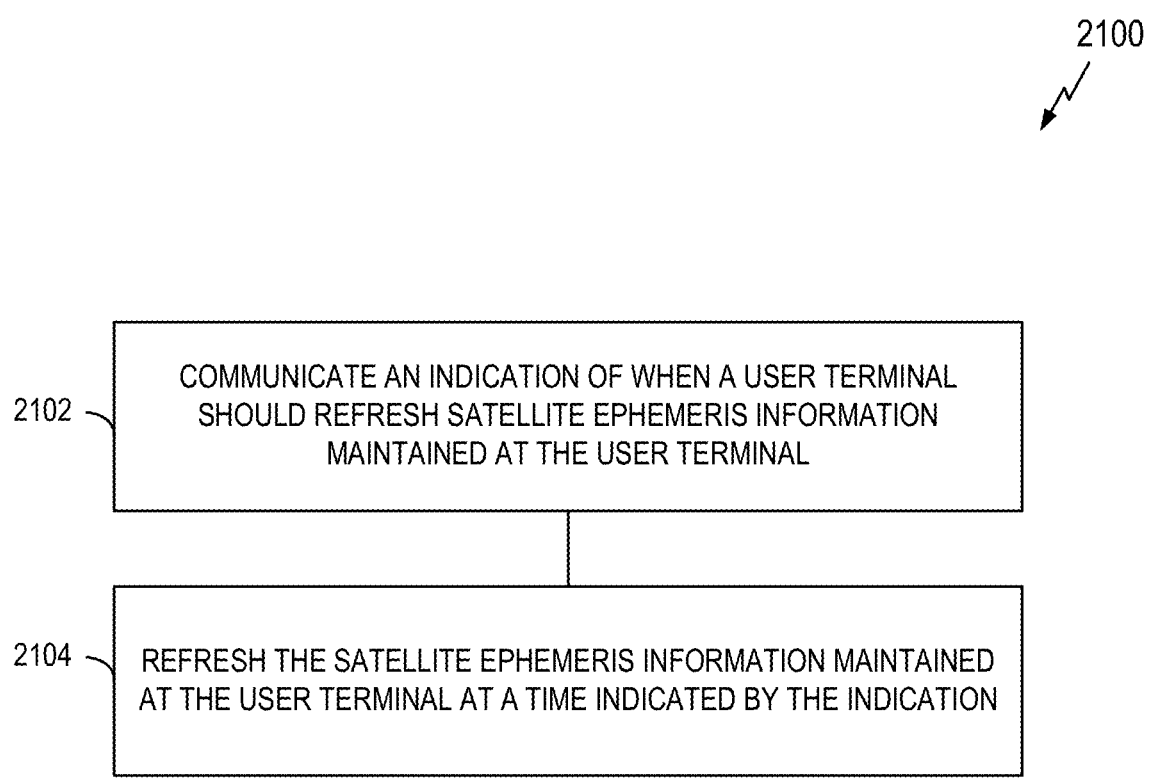
FIG. 21 is a flowchart illustrating an example of a process for refreshing ephemeris information in accordance with some aspects of the disclosure.

FIG. 21 illustrates a process 2100 for communication in accordance with some aspects of the disclosure. In some aspects, the process 2100 may be performed in conjunction with (e.g., as part of or in addition to) the process 1900 of FIG. 19. The process 2100 may take place, at least in part, within a processing circuit (e.g., the processing circuit 1810 of FIG. 18), which may be located in a UT or some other suitable apparatus. Of course, in various aspects within the scope of the disclosure, the process 2100 may be implemented by any suitable apparatus capable of supporting communication operations.

At block 2102, an apparatus (e.g., a UT) communicates (e.g., receives) an indication of when a user terminal should refresh satellite ephemeris information (e.g., other satellite ephemeris information) maintained at the user terminal. In some implementations, the circuit/module for communicating 1820 of FIG. 18 performs the operations of block 2102. In some implementations, the code for communicating 1832 of FIG. 18 is executed to perform the operations of block 2102.

At block 2104, the apparatus refreshes the satellite ephemeris information maintained at the user terminal at a time indicated by the indication. In some aspects, refreshing the satellite ephemeris information may include re-reading a BIBe. In some implementations, the circuit/module for refreshing ephemeris information 1826 of FIG. 18 performs the operations of block 2104. In some implementations, the code for refreshing ephemeris information 1838 of FIG. 18 is executed to perform the operations of block 2104.

Ninth Example Process

Figure 22:
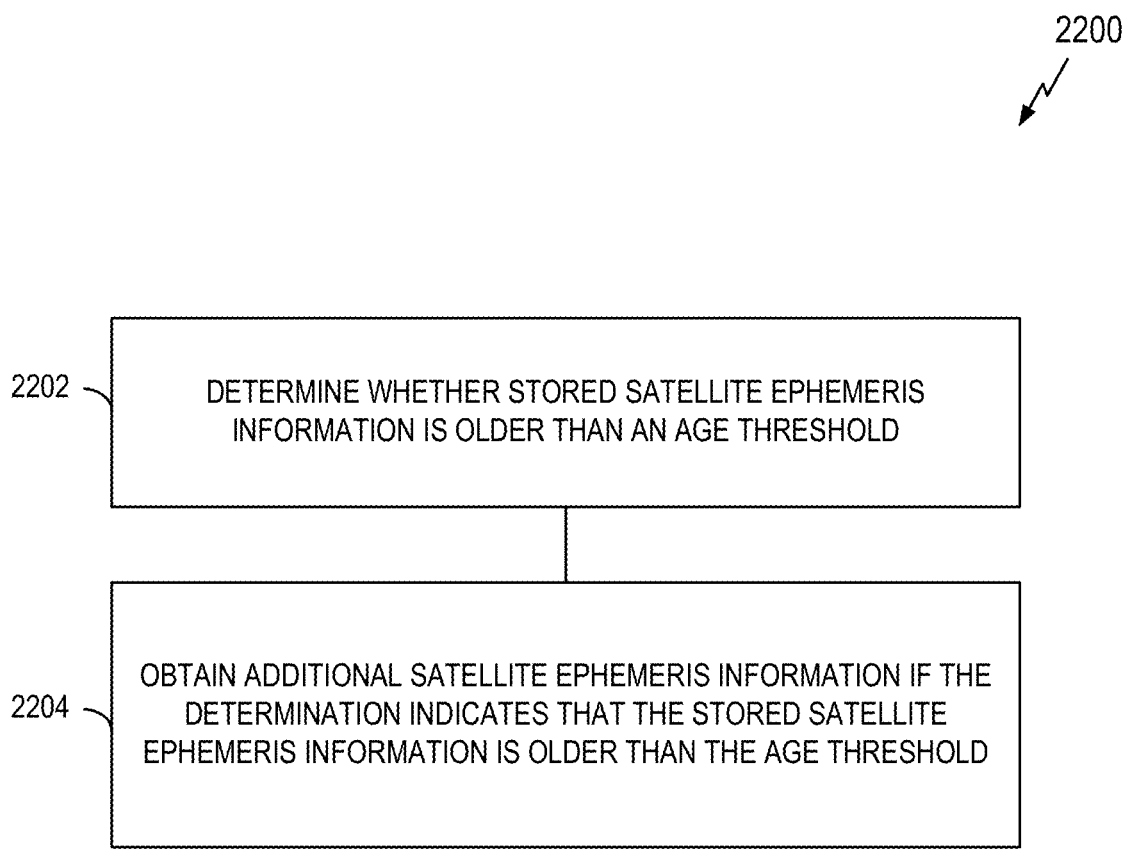
FIG. 22 is a flowchart illustrating an example of a process for managing ephemeris information in accordance with some aspects of the disclosure.

FIG. 22 illustrates a process 2200 for communication in accordance with some aspects of the disclosure. In some aspects, the process 2200 may be performed in conjunction with (e.g., as part of or in addition to) the process 1900 of FIG. 19. The process 2200 may take place, at least in part, within a processing circuit (e.g., the processing circuit 1810 of FIG. 18), which may be located in a UT or some other suitable apparatus. Of course, in various aspects within the scope of the disclosure, the process 2200 may be implemented by any suitable apparatus capable of supporting communication operations.

At block 2202, an apparatus (e.g., a UT) determines whether satellite ephemeris information stored at a UT is older than an age threshold. In some implementations, the circuit/module for determining whether ephemeris information is older than a threshold 1822 of FIG. 18 performs the operations of block 2202. In some implementations, the code for determining whether ephemeris information is older than a threshold 1834 of FIG. 18 is executed to perform the operations of block 2202.

At block 2204, the apparatus obtains additional satellite ephemeris information if the determination indicates that the stored satellite ephemeris information is older than the age threshold. In some implementations, the circuit/module for obtaining additional ephemeris information 1824 of FIG. 18 performs the operations of block 2204. In some implementations, the code for obtaining additional ephemeris information 1836 of FIG. 18 is executed to perform the operations of block 2204.

Tenth Example Process

Figure 23:
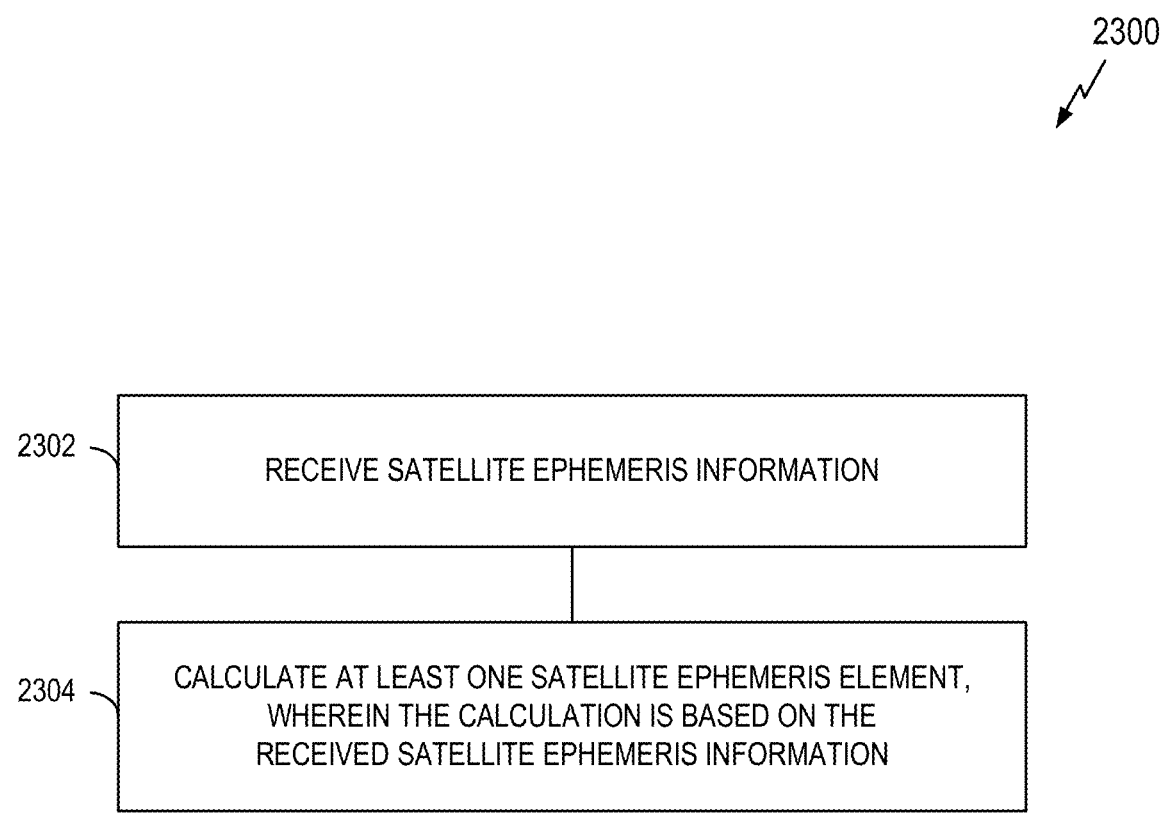
FIG. 23 is a flowchart illustrating an example of a process for calculating a satellite ephemeris element in accordance with some aspects of the disclosure.

FIG. 23 illustrates a process 2300 for communication in accordance with some aspects of the disclosure. In some aspects, the process 2300 may be performed in conjunction with (e.g., as part of or in addition to) the process 1900 of FIG. 19. The process 2300 may take place, at least in part, within a processing circuit (e.g., the processing circuit 1810 of FIG. 18), which may be located in a UT or some other suitable apparatus. Of course, in various aspects within the scope of the disclosure, the process 2300 may be implemented by any suitable apparatus capable of supporting communication operations.

At block 2302, an apparatus (e.g., a UT) receives satellite ephemeris information. In some implementations, the circuit/module for receiving ephemeris information 1828 of FIG. 18 performs the operations of block 2302. In some implementations, the code for receiving ephemeris information 1840 of FIG. 18 is executed to perform the operations of block 2302.

At block 2304, the apparatus calculates at least one satellite ephemeris element. In some aspects, the calculation may be based on the satellite ephemeris information received at block 2302. In some implementations, the circuit/module for calculating 1830 of FIG. 18 performs the operations of block 2304. In some implementations, the code for calculating 1842 of FIG. 18 is executed to perform the operations of block 2304.

Eleventh Example Process

Figure 24:
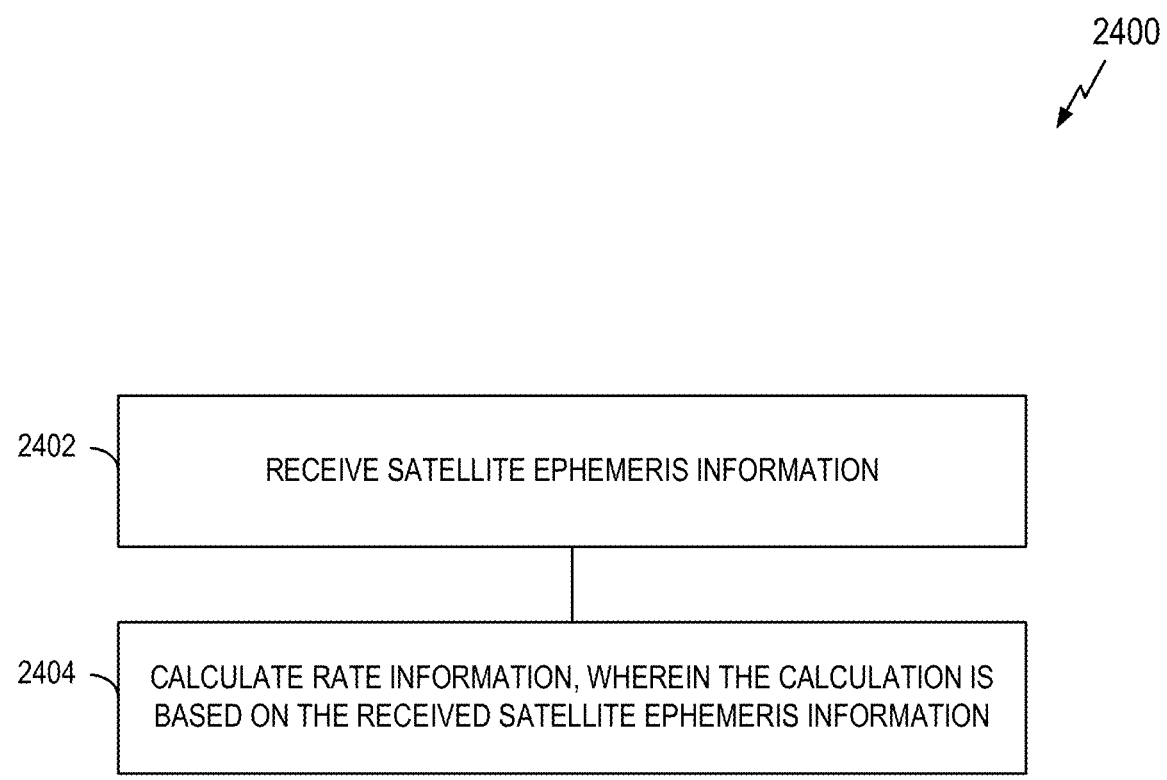
FIG. 24 is a flowchart illustrating an example of a process for calculating rate information in accordance with some aspects of the disclosure.

FIG. 24 illustrates a process 2400 for communication in accordance with some aspects of the disclosure. In some aspects, the process 2400 may be performed in conjunction with (e.g., as part of or in addition to) the process 1900 of FIG. 19. The process 2400 may take place, at least in part, within a processing circuit (e.g., the processing circuit 1810 of FIG. 18), which may be located in a UT or some other suitable apparatus. Of course, in various aspects within the scope of the disclosure, the process 2400 may be implemented by any suitable apparatus capable of supporting communication operations.

At block 2402, an apparatus (e.g., a UT) receives satellite ephemeris information. In some implementations, the circuit/module for receiving ephemeris information 1828 of FIG. 18 performs the operations of block 2402. In some implementations, the code for receiving ephemeris information 1840 of FIG. 18 is executed to perform the operations of block 2402.

At block 2404, the apparatus calculates rate information associated with the satellite ephemeris information. In some aspects, the calculation may be based on the satellite ephemeris information received at block 2402. In some aspects, the rate information may be associated with satellite inclination or satellite angle. In some implementations, the circuit/module for calculating 1830 of FIG. 18 performs the operations of block 2404. In some implementations, the code for calculating 1842 of FIG. 18 is executed to perform the operations of block 2404.

Additional Aspects

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an"

and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of a, b, or c" or "one or more of a, b, or c" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication, comprising:
   by a user terminal:
   receiving, via a broadcast transmission, one or more broadcast information block messages that include:
   a first broadcast information block element; and
   a second broadcast information block element;
   the first broadcast information block element indicating a periodicity of the second broadcast information block element;
   the second broadcast information block element including:
   satellite ephemeris information; and
   a refresh period indicating a time duration within which the user terminal is to perform another reading of the second broadcast information block element;
   determining that the user terminal will not be able to perform another reading of the second broadcast information block element before an expiration of the refresh period; and
   in response to determining that the user terminal will not be able to perform another reading of the second broadcast information block element before an expiration of the refresh period:
   sending, via a unicast transmission, a request via a satellite for satellite ephemeris information; and
   receiving, via a unicast transmission, a response to the request, wherein the response comprises the requested satellite ephemeris information.

2. The method of claim 1, further comprising:
   calculating at least one satellite ephemeris element at the user terminal based on the requested satellite ephemeris information.

3. The method of claim 1, further comprising:
   calculating rate information at the user terminal, wherein the calculation is based on the requested satellite ephemeris information.

4. The method of claim 3, wherein the rate information is associated with satellite inclination or satellite angle.

5. An apparatus for communication, comprising:
   a memory; and
   a processor coupled to the memory,
   the processor and the memory configured to:
   receive, via a broadcast transmission, one or more broadcast information block messages that include:
   a first broadcast information block element; and
   a second broadcast information block element;
   the first broadcast information block element indicating a periodicity of the second broadcast information block element;
   the second broadcast information block element including:
   satellite ephemeris information; and
   a refresh period indicating a time duration within which a user terminal is to perform another reading of the second broadcast information block element;
   determine that the user terminal will not be able to perform another reading of the second broadcast information block element before an expiration of the refresh period; and
   in response to determining that the user terminal will not be able to perform another reading of the second broadcast information block element before an expiration of the refresh period:
   send, via a unicast transmission, a request via a satellite for satellite ephemeris information; and
   receive, via a unicast transmission, a response to the request, wherein the response comprises the requested satellite ephemeris information.

6. The apparatus of claim 5, wherein the processor and the memory are further configured to:
   calculate at least one satellite ephemeris element at the user terminal based on the requested satellite ephemeris information.

7. The apparatus of claim 5, wherein the processor and the memory are further configured to:

calculate rate information at the user terminal, wherein the calculation is based on the requested satellite ephemeris information.

8. The apparatus of claim 7, wherein the rate information is associated with satellite inclination or satellite angle.

9. An apparatus for communication, comprising:
means for receiving, via a broadcast transmission, one or more broadcast information block messages that include:
a first broadcast information block element; and
a second broadcast information block element;
the first broadcast information block element indicating a periodicity of the second broadcast information block element;
the second broadcast information block element including:
satellite ephemeris information; and
a refresh period indicating a time duration within which a user terminal is to perform another reading of the second broadcast information block element;
means for determining that the user terminal will not be able to perform another reading of the second broadcast information block element before an expiration of the refresh period; and
means for, in response to determining that the user terminal will not be able to perform another reading of the second broadcast information block element before an expiration of the refresh period:
sending, via a unicast transmission, a request via a satellite for satellite ephemeris information; and
receiving, via a unicast transmission, a response to the request, wherein the response comprises the requested satellite ephemeris information.

10. A non-transitory computer-readable medium storing computer-executable code, including code to:
receive, via a broadcast transmission, one or more broadcast information block messages that include:
a first broadcast information block element; and
a second broadcast information block element;
the first broadcast information block element indicating a periodicity of the second broadcast information block element;
the second broadcast information block element including:
satellite ephemeris information; and
a refresh period indicating a time duration within which a user terminal is to perform another reading of the second broadcast information block element;
determine that the user terminal will not be able to perform another reading of the second broadcast information block element before an expiration of the refresh period; and
in response to determining that the user terminal will not be able to perform another reading of the second broadcast information block element before an expiration of the refresh period:
send, via a unicast transmission, a request via a satellite for satellite ephemeris information; and
receive, via a unicast transmission, a response to the request, wherein the response comprises the requested satellite ephemeris information.

* * * * *